(12) United States Patent
Cho et al.

(10) Patent No.: US 8,908,578 B2
(45) Date of Patent: Dec. 9, 2014

(54) METHOD FOR REQUESTING AND ALLOCATING UPLINK RESOURCE IN WIRELESS COMMUNICATION SYSTEM

(75) Inventors: Hee Jeong Cho, Anyang-si (KR); Ki Seon Ryu, Anyang-si (KR); Doo Hyun Sung, Anyang-si (KR); Sung Ho Park, Anyang-si (KR); Yong Ho Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 407 days.

(21) Appl. No.: 13/141,321

(22) PCT Filed: Dec. 15, 2009

(86) PCT No.: PCT/KR2009/007502
§ 371 (c)(1),
(2), (4) Date: Sep. 8, 2011

(87) PCT Pub. No.: WO2010/074448
PCT Pub. Date: Jul. 1, 2010

(65) Prior Publication Data
US 2011/0317638 A1   Dec. 29, 2011

Related U.S. Application Data

(60) Provisional application No. 61/139,637, filed on Dec. 22, 2008, provisional application No. 61/143,381, filed on Jan. 8, 2009, provisional application No. 61/150,009, filed on Feb. 5, 2009, provisional application No. 61/155,910, filed on Feb. 26, 2009, provisional application No. 61/157,561, filed on Mar. 5, 2009, provisional application No. 61/163,060, filed on Mar. 25, 2009, provisional application No. 61/163,463, filed on Mar. 26, 2009.

(30) Foreign Application Priority Data

Apr. 2, 2009  (KR) .................. 10-2009-0028564
Jun. 5, 2009  (KR) .................. 10-2009-0049809

(51) Int. Cl.
*H04B 7/00*  (2006.01)
*H04J 3/16*  (2006.01)
*H04W 72/04*  (2009.01)

(52) U.S. Cl.
CPC ...... *H04W 72/0413* (2013.01); *H04W 72/0453* (2013.01)
USPC ........................................... 370/310; 370/468

(58) Field of Classification Search
None
See application file for complete search history.

(56) References Cited

U.S. PATENT DOCUMENTS 5,719,859 A * 2/1998 Kobayashi et al. ........... 370/347
6,195,699 B1   2/2001 Dennis
(Continued)

FOREIGN PATENT DOCUMENTS

CN  1794827  6/2006
CN  1929614  3/2007
(Continued)

OTHER PUBLICATIONS

The State Intellectual Property Office of the People's Republic of China Application Serial No. 201080010091.7, Office Action dated Aug. 22, 2013, 9 pages.

*Primary Examiner* — Chirag Shah
*Assistant Examiner* — Joshua Smith
(74) *Attorney, Agent, or Firm* — Lee, Hong, Degerman, Kang & Waimey

(57) ABSTRACT

The present invention relates to a method for requesting an uplink resource in a wireless communication system. In the method according to one aspect of the invention, a terminal transmits a quick access message to a base station and receives a resource from the base station. The quick access message includes a first field that shows the attributes of the data that is supposed to be transmitted by the terminal, and a field that is determined by the first field.

5 Claims, 26 Drawing Sheets

| Service type/priority(2bits) | Station ID (10~12 bits) | CRC (2~4 bits) |

(a) delay sensitive service

| Service type/priority(2bits) | Request size (10 bits) | CRC (4 bits) |

(b) delay tolerant service

(56) References Cited

U.S. PATENT DOCUMENTS

| | | |
|---|---|---|
| 2001/0033560 A1 | 10/2001 | Tong et al. |
| 2003/0117969 A1 | 6/2003 | Koo et al. |
| 2005/0064818 A1* | 3/2005 | Assarsson et al. ............ 455/41.2 |
| 2005/0255862 A1* | 11/2005 | Jung et al. ..................... 370/338 |
| 2006/0239241 A1* | 10/2006 | Eom et al. ..................... 370/348 |
| 2006/0251028 A1* | 11/2006 | Nagata et al. ................. 370/338 |
| 2007/0211661 A1 | 9/2007 | Tee et al. |
| 2007/0248086 A1* | 10/2007 | Petersen ....................... 370/389 |
| 2007/0293231 A1* | 12/2007 | So ................................. 455/450 |
| 2008/0002713 A1* | 1/2008 | Fujita ......................... 370/395.6 |
| 2008/0056188 A1 | 3/2008 | Lu et al. |
| 2008/0192931 A1 | 8/2008 | Cho et al. |
| 2009/0073911 A1* | 3/2009 | Cheon et al. ................... 370/312 |
| 2009/0086641 A1* | 4/2009 | Mushtaq et al. ............ 370/241.1 |
| 2009/0092076 A1* | 4/2009 | Zheng et al. ................... 370/328 |
| 2009/0141670 A1* | 6/2009 | Duncan Ho .................. 370/328 |
| 2009/0323602 A1* | 12/2009 | Li et al. ......................... 370/329 |
| 2010/0103885 A1* | 4/2010 | Cordeiro et al. .............. 370/329 |
| 2010/0205283 A1 | 8/2010 | Cho et al. |
| 2010/0220691 A1 | 9/2010 | Chang et al. |
| 2012/0063409 A1* | 3/2012 | Novak et al. .................. 370/330 |

FOREIGN PATENT DOCUMENTS

| | | |
|---|---|---|
| CN | 102308495 | 1/2012 |
| JP | 2004531937 | 10/2004 |
| JP | 2008278343 | 11/2008 |
| KR | 20070001266 | 1/2007 |
| KR | 20070011170 | 1/2007 |

* cited by examiner

FIG. 10
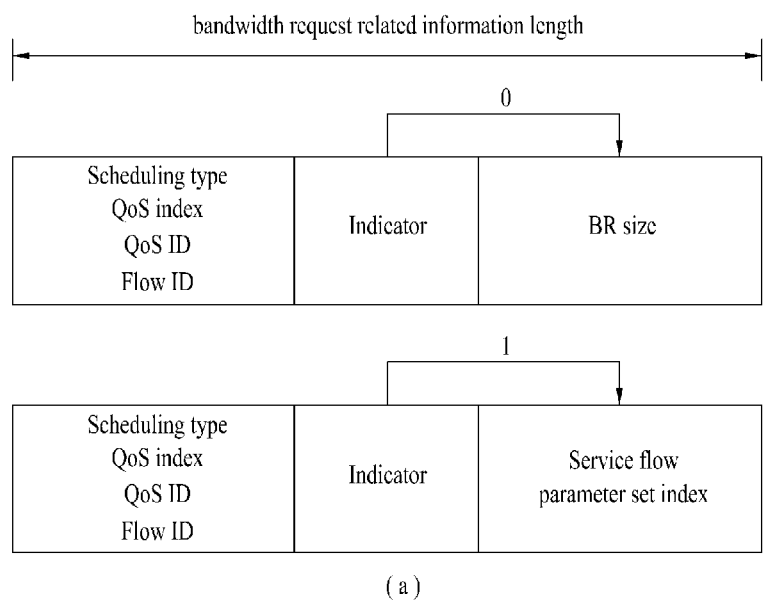
(a)
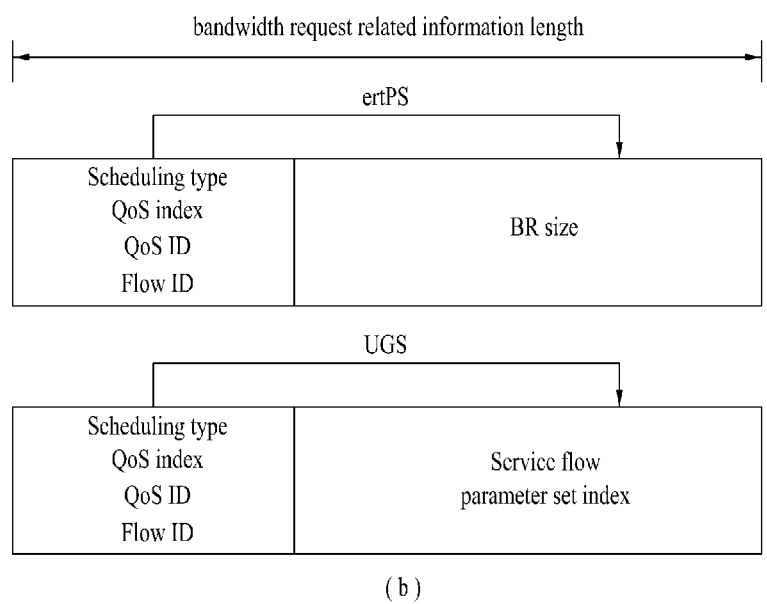
(b)

FIG. 16

| Service type/priority(2bits) | Station ID (10~12 bits) | CRC (2~4 bits) |

(a) delay sensitive service

| Service type/priority(2bits) | Request size (10 bits) | CRC (4 bits) |

(b) delay tolerant service

FIG. 17

| BR type (1bit) | QoS ID (3 bits) | Request size (8 bits) | CRC (4 bits) |

(a) BR type=0

| BR type (1bit) | Station ID (10~12 bits) | CRC (3~5 bits) |

(b) BR type=1

FIG. 18

| BR type (1bit) | Station ID (10~12 bits) | CRC (3~5 bits) |

(a) delay sensitive service

| BR type (1bit) | QoS ID (1~3 bits) | Request size (8~10 bits) | CRC (4 bits) |

(b) delay tolerant service

FIG. 19

(a) Type | Sign | Request size (b) Type | Request size

1

METHOD FOR REQUESTING AND ALLOCATING UPLINK RESOURCE IN WIRELESS COMMUNICATION SYSTEM

This application is the National Stage filing under 35 U.S.C. 371 of International Application No. PCT/KR2009/007502, filed on Dec. 15, 2009, which claims the benefit of earlier filing date and right of priority to Korean Application Nos. 10-2009-0049809, filed on Jun. 5, 2009, and 10-2009-0028564, filed on Apr. 2, 2009, and also claims the benefit of U.S. Provisional Application Ser. Nos. 61/163,463, filed on Mar. 26, 2009, 61/163,060, filed on Mar. 25, 2009, 61/157,561, filed on Mar. 5, 2009, 61/155,910, filed on Feb. 26, 2009, 61/150,009, filed on Feb. 5, 2009, 61/143,381, filed on Jan. 8, 2009, and 61/139,637, filed on Dec. 22, 2008, the contents of all of which are incorporated by reference herein in their entireties.

TECHNICAL FIELD

The present invention relates to a wireless communication system, and more particularly, to a radio resource allocation method for a bandwidth request transmission in a wireless communication system and an uplink resource requesting method therefor.

BACKGROUND ART

A voice service includes an active interval for transmitting voice data actually and a silent interval in which voice data to be transmitted is not generated.

A method of allocating a radio source per scheduling type according to a related art is explained as follows.

FIG. 1 is a diagram for a radio resource allocating method of an unsolicited grant service (hereinafter abbreviated USG) according to a related art.

The USG supports such a real-time traffic as a voice and also allocates a radio resource of a fixed size to a mobile station by each predetermined period. Referring to FIG. 1, a mobile station transmits voice packets in an active interval using an allocated radio resource of a fixed size. In a silent interval, the mobile station transmits a silence insertion descriptor (hereinafter abbreviated 'SID') using a portion of the allocated radio resource of the fixed size. Since a mobile station is unable to recognize whether a connection between the mobile station and a base station is maintained unless transmitting data to the base station, the SID packets are dummy data transmitted to the base station by the mobile station to maintain the connection between the mobile station and the base station. Hence, since there exists a considerable amount of the radio resource unused in the silent interval, the radio resource is considerably wasted.

FIG. 2 is a diagram for a method of a first radio resource allocating method for an extended-real-time polling service (hereinafter named 'ertPS') according to a related art.

The ertPS supports a real-time traffic supporting a variable bit rate like VoIP (voice over internet protocol) that supports silence deletion.

Referring to FIG. 2, a base station allocates a radio resource of a size requested by a mobile station to a mobile station by determined periods. The mobile station then transmits voice packets using the allocated radio resource. In a silent interval, the base station allocates a radio resource of a size requested by the mobile station by periods. The mobile station transmits SID packet and a bandwidth request header (BR header) or a grant management header using the allocated resource of a changed size.

The mobile station requests to allocate a radio resource of a size, which is different from that of a current period, from a next period through the bandwidth request header or the grant management header.

In FIG. 2, by a first period of the silent interval, the mobile station receives an allocation of a radio resource of the same size in the active interval and then transmits SID packet and a bandwidth request header or a grant management header via a portion of the allocated radio resource. Yet, the rest of the allocated radio resource is wasted. By a second period of the silent interval, the mobile station receives an allocation of a radio resource of a size smaller than that of the former radio resource allocated by the first period of the silent interval and then transmits a bandwidth request header or a grant management header through a portion of the allocated radio resource. Yet, the rest of the allocated radio resource is wasted. By a sixth period of the silent interval, the mobile station requests a radio resource corresponding to a size of a voice packet via a bandwidth request header or a grant management header. Therefore, since there exists a considerable amount of unused radio resource in the silent interval, the radio resource is considerably wasted.

FIG. 3 is a diagram for a second radio resource allocating method for an extended-real-time polling service (hereinafter abbreviated 'ertPS') according to a related art.

Referring to FIG. 3, a base station allocates a radio resource of a size requested by a mobile station to the mobile station by determined periods. The mobile station then transmits voice packets using the allocated radio resource.

In a silent interval, the base station allocates a radio resource of a size requested by the mobile station. In doing so, the base station is unable to receive data via the allocated radio resource, the base station stops allocating the radio resource. In particular, in FIG. 3, by a fourth period of the silent interval, the base station is unable to receive data via the allocated radio resource and does not allocate the radio resource since then.

The mobile station transmits SID packet and a bandwidth header (BD header) or a grant management header using the radio resource allocated in the silent interval. If the mobile station fails in receiving the allocation of the radio resource, the mobile station requests the radio resource by a content or non-content based scheme on an uplink control channel. In this case, the uplink control channel includes a bandwidth request channel and a fast feedback channel.

According to the second radio resource allocating method for the ertPS, an uplink control channel has a latency problem due to a transmit period or a contention-based scheme and a signaling overhead may increase.

A resource requesting method in a wireless communication system can be categorized into a 5-step scheme and a 3-step scheme which is a fast access scheme.

First of all, according to the 3-step scheme, a mobile station transmits a bandwidth request indicator and a quick access message to a base station. In this case, the quick access message can include a mobile station ID, a requested resource size, a QoS ID and the like. Having received the bandwidth request indicator and the quick access message from the mobile station, the base station allocates an uplink resource to the mobile station. Subsequently, the mobile station transmits data via the allocated resource. In doing so, the mobile station is able to an additional uplink bandwidth request information.

Secondly, the 5-step scheme is usable independently from the 3-step scheme or is usable as substitutive scheme for the 3-step scheme.

According to the 5-step scheme, if a mobile station transmits a bandwidth request indicator to a base station, the base station allocates an uplink resource for transmitting a bandwidth request message (BW-REQ message) to the mobile station. If the mobile station sends a bandwidth request message via the allocated resource, the base station allocates an uplink resource to the mobile station. Subsequently, the mobile station transmits data via the allocated resource. In doing so, the mobile station is able to additional uplink bandwidth request information.

Since a size of a quick access message or a bandwidth request message is limited, a quantity or size of information carried by the quick access message or the bandwidth request message is limitative. However, as information, which should be transmitted by the mobile station in a process for requesting an uplink resource, differs in accordance with property of data the mobile station intends to transmit, it is impossible for all information, which is required for requesting an uplink resource for transmitting data of all properties, to be included in the quick access message or the bandwidth request message.

DISCLOSURE OF THE INVENTION

Technical Problem

As mentioned in the foregoing description, in a radio resource allocating method according to a related art, a radio resource is considerably wasted, a latency problem is caused, and a signaling overhead increases. Moreover, since a size of a quick access message or a bandwidth request message is limited, it causes a problem that all information required for requesting an uplink resource for transmitting data of all properties is not included in the quick access message or the bandwidth request message.

An object of the present invention is to provide a radio resource allocating method, by which a limited radio resource can be efficiently used in a wireless communication system.

Another object of the present invention is to provide a radio resource allocating method, by which a latency occurring in the course of transmitting a bandwidth request from a mobile station can be reduced.

A further object of the present invention is to provide formats of a quick access message and a bandwidth request message in accordance with a property of data a mobile station intends to transmit.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

Technical Solution

To achieve these and other advantages and in accordance with the purpose of the present invention, as embodied and broadly described, in a radio resource allocating method for a bandwidth request transmission in a base station of a wireless communication system, the radio resource allocating method includes the steps of allocating a radio resource for the bandwidth request transmission in a silent interval of a mobile station to the mobile station in the course of providing a voice service and receiving a bandwidth request message from the mobile station via the allocated radio resource.

To further achieve these and other advantages and in accordance with the purpose of the present invention, in a method of requesting a bandwidth from a mobile station in the course of a voice service in a wireless communication system, the bandwidth requesting method includes the steps of receiving an allocation of a radio resource for a bandwidth request transmission in a silent interval from a base station and transmitting a bandwidth request message to the base station via the allocated radio resource.

To further achieve these and other advantages and in accordance with the purpose of the present invention, in a method of requesting an uplink resource from a mobile station of a wireless communication system, the uplink resource requesting method includes the steps of transmitting a quick access message including a first field indicating a property of data to be transmitted by the mobile station and a field determined by the first field to a base station and receiving an allocation of a resource from the base station.

To further achieve these and other advantages and in accordance with the purpose of the present invention, a method of allocating an uplink resource, which is allocated by a base station in a wireless communication system, the uplink resource allocating method includes the steps of receiving a quick access message including a first field indicating a property of data to be transmitted by a mobile station and a field determined by the first field from the mobile station and allocating a resource to the mobile station.

The first field indicates a service type and priority of the data to be transmitted by the mobile station. If the first field indicates that the data to be transmitted by the mobile station is a delay sensitive service, the quick access message includes a second field indicating a mobile station ID of the mobile station. If the first field indicates that the data to be transmitted by the mobile station is a delay tolerant service, the quick access message includes a third field indicating a size of the resource requested by the mobile station.

The third field includes a fourth field indicating whether the size of the resource requested by the mobile station has a value greater or smaller than a default value previously determined between the mobile station and the base station and a fifth field indicating a difference between the size of the resource requested by the mobile station and the default value.

The first field indicates a flow number of the data to be transmitted by the mobile station and also indicates whether data properties of a plurality of flows are similar when the mobile station attempts to transmit a plurality of the flows. If the first field indicates that the flow number of the data to be transmitted by the mobile station is 1 or indicates that the data properties of a plurality of the flows are similar when the mobile station attempts to transmit a plurality of the flows, the quick access message includes a second field indicating a QoS ID of the data to be transmitted by the mobile station. If the first field indicates that the data properties of a plurality of the flows are similar when the mobile station attempts to transmit a plurality of the flows, the quick access message includes a third field indicating a mobile station ID of the mobile station.

Advantageous Effects

Accordingly, embodiments of the present invention provide the following effects and/or advantages.

First of all, a radio resource available for a bandwidth request is allocated in a silent interval only, whereby the radio resource can be efficiently used.

Secondly, a radio resource available for a bandwidth request is allocated in a silent interval only, whereby a latency can be reduced.

Thirdly, a format of a quick access message is differentiated in accordance with a property of data a mobile station intends to transmit, whereby various kinds of informations can be efficiently transmitted.

Effects obtainable from the present invention are non-limited the above mentioned effect. And, other unmentioned effects can be clearly understood from the following description by those having ordinary skill in the technical field to which the present invention pertains.

DESCRIPTION OF DRAWINGS

FIG. 10(a) is a diagram for a case that a bandwidth request related information received by a base station together with a bandwidth request code from a mobile station varies in accordance with an identifier.

FIG. 10(b) is a diagram for a case that a bandwidth request related information received by a base station together with a bandwidth request code from a mobile station varies in accordance with a scheduling service type.

FIG. 16(a) is a diagram for a first format of a quick access message according to an embodiment of the present invention if data to be transmitted by a mobile station is a delay sensitive service, and FIG. 16(b) is a diagram for a first format of a quick access message according to an embodiment of the present invention if data to be transmitted by a mobile station is a delay tolerant service.

FIG. 17(a) is a diagram for a second format of a quick access message according to an embodiment of the present invention if a bandwidth request type (hereinafter abbreviated 'BR type') of data to be transmitted by a mobile station is set to 0. And, FIG. 17(b) is a diagram for a second format of a quick access message according to an embodiment of the present invention if a BR type of data to be transmitted by a mobile station is set to 0.

FIG. 18(a) is a diagram for a third format of a quick access message according to an embodiment of the present invention if data to be transmitted by a mobile station is a delay sensitive service, and FIG. 18(b) is a diagram for a third format of a quick access message according to an embodiment of the present invention if data to be transmitted by a mobile station is a delay tolerant service.

FIG. 19 is a diagram for a data format of a difference value if 'request size' shown in FIGS. 2 to 4 is transmitted in a form of a difference from a default value.

BEST MODE FOR INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made centering on predetermined terminologies, they need not to be limited to the terminologies. If the following descriptions are made using random terminologies, the same meanings can be provided. Wherever possible, the same reference numbers will be used throughout the drawings to refer to the same or like parts.

Throughout this disclosure, if a prescribed part 'includes' a prescribed element, it means that another element can be further included instead of eliminating other elements as long as absence of special objection. Moreover, such a terminology as '~part' '~functionality', '~module' and the like means a unit for handling at least one function or operation, which can be implemented by software, hardware or combination thereof.

A radio resource allocating method for a bandwidth request transmission in a base station of a wireless communication system according to an embodiment of the present invention is explained with reference to FIGS. 4 to 14.

Figure 4:
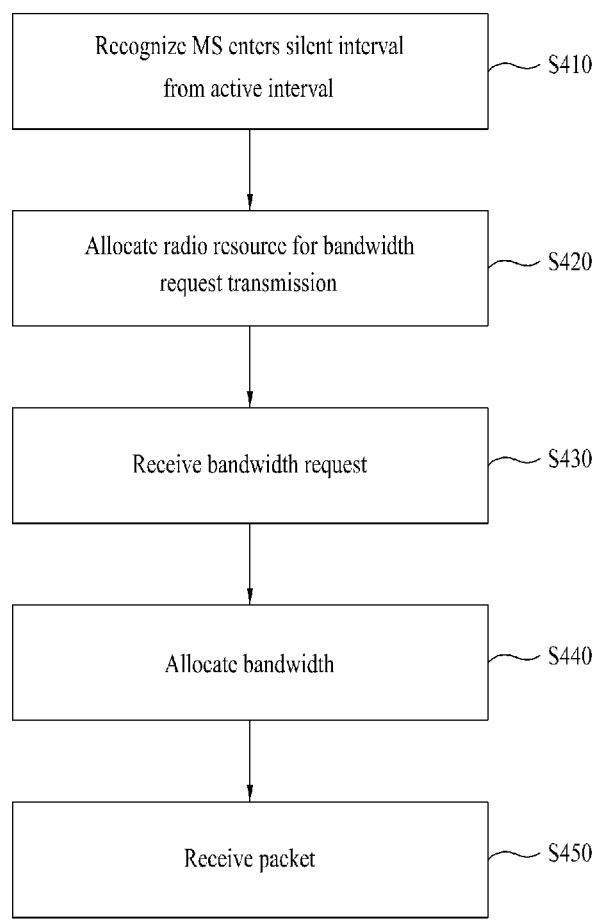
FIG. 4 is a flowchart of a radio resource allocating method for a bandwidth request transmission in a base station of a wireless communication system according to an embodiment of the present invention.

FIG. 4 is a flowchart of a radio resource allocating method for a bandwidth request transmission in a base station of a wireless communication system according to an embodiment of the present invention.

In an active interval, a base station allocates a radio resource for data transmission to a mobile station by each determined period (T). The mobile station then transmits a voice packet using the allocated radio resource. In this case, the determined period (T) is a transmission period of a service received by the mobile station or a polling period. And, the mobile station is able to request a radio resource allocation via the allocated radio resource. In particular, the mobile station is able to make a request for a radio resource allocation via a signaling header or a MAC sub-header.

Once the mobile station used to be in the active interval enters a silent interval, the mobile station recognizes that the mobile station has entered the silent interval from the active interval in accordance with a notification made by the mobile station or a specific protocol [S410]. In particular, the mobile station is able to inform the base station of its entry into the silent interval or the base station is able to recognize the silent interval entry of the mobile station in accordance with a specific protocol.

First of all, a method for a mobile station to inform a base station of its entry into a silent interval is described as follows.

A mobile station is able to inform a base station that the mobile station has entered a silent interval using a 1-bit indicator through a signaling header, a MAC subheader or a fast feedback channel.

And, the mobile station is able to information the base station that the mobile station has entered the silent interval through signaling on a service flow parameter set. In a single flow, a value of such a QoS parameter as a traffic rate, a grant interval and the like can vary. Hence, it is able to generate a plurality of sets in a manner of combining values of the QoS parameters. In particular, a set generated from combining the values of the QoS parameters is a service flow parameter set. A single flow can have a plurality of service flow parameter sets. And, each of a plurality of the service flow parameter sets has a corresponding index.

In case of changing a service flow parameter set, a mobile station transmits a signaling on a service flow parameter set change to a base station. If a mobile station in an active interval enters a silent interval, the mobile station changes a service flow parameter set and then transmits a signaling on the service flow parameter change to the base station. In doing so, the mobile station is able to transmit the signaling on the service flow parameter set change in a manner that a field for requesting a radio resource for a bandwidth request transmission is added within the corresponding signaling.

The base station is able to recognize that the mobile station has entered the silent interval in accordance with the field for requesting the radio resource for the bandwidth request transmission including the signaling on the service flow parameter set change. Alternatively, the base station is able to recognize that the mobile station has entered the silent interval in accordance with a grant period or a polling period of the service flow parameter set the mobile station attempts to change.

A mobile station, which uses G723.1 audio codec, periodically transmits voice data in an active interval and non-periodically transmits SID in a silent interval. Therefore, a grant or polling period of a service flow parameter set for the silent interval is set to 0. Hence, if the grant or polling period of the service flow parameter set, which is to be changed by the mobile station, is 0, the base station recognizes that the mobile station has entered the silent interval.

In the following description, a method for a base station to recognize a silent interval entry of a mobile station in accordance with a specific protocol is explained with reference to FIGS. 5 to 7.

In the following description of an embodiment of the present invention, there are three kinds of methods for a base station to recognize a silent interval entry of a mobile station. According to a first method, after a base station has received a voice packet from a mobile station, if the base station does not receive a voice packet during a predetermined count of predetermined periods (T), the base station recognizes that the mobile station has entered a silent interval. According to a second method, if the base station does not receive a voice packet during a predetermined time, the base station recognizes that the mobile station has entered a silent interval. According to a third method, if the base station receives SID packets over a previously determined count, the base station recognizes that the mobile station has entered a silent interval.

In the above-mentioned three kinds of the methods, after a physical layer of voice codec of the base station has received a last voice packet, if failing in receiving a voice packet during a previously determined count of periods (T), failing in receiving a voice packet during a previously determined time or succeeding in receiving SID packets over a previously determined count, it informs a layer related to a radio resource allocation that the mobile station has entered the silent interval. In this case, the layer related to the radio resource allocation can include a MAC layer.

Figure 5:
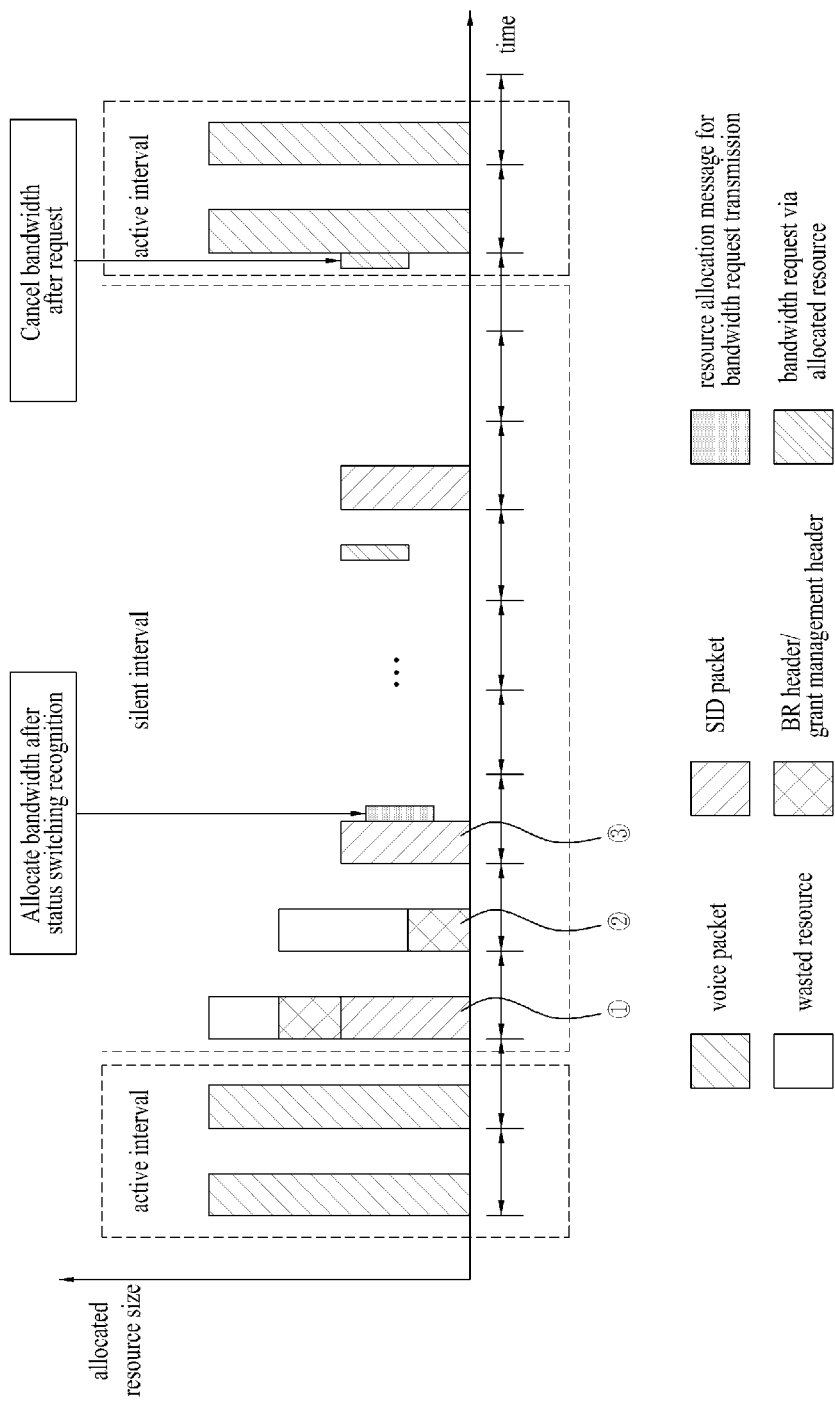
FIG. 5 is a diagram for a case that a base station recognizes a silent interval entry of a mobile station if failing in receiving a voice packet during 3 periods (T) after reception of a last voice packet.

FIG. 5 is a diagram for a case that a base station recognizes a silent interval entry of a mobile station if failing in receiving a voice packet during 3 periods (T) after reception of a last voice packet.

Referring to FIG. 5, if a mobile station enters a silent interval from an active interval, it transmits not a voice packet but an SID packet and a BR or grant management header. Thereafter, if a base station does not receive a voice packet during 3 periods, it recognizes that the mobile station has entered the silent interval, stops allocating a radio resource for a data transmission, and allocates a radio resource for a bandwidth request transmission.

Figure 6:
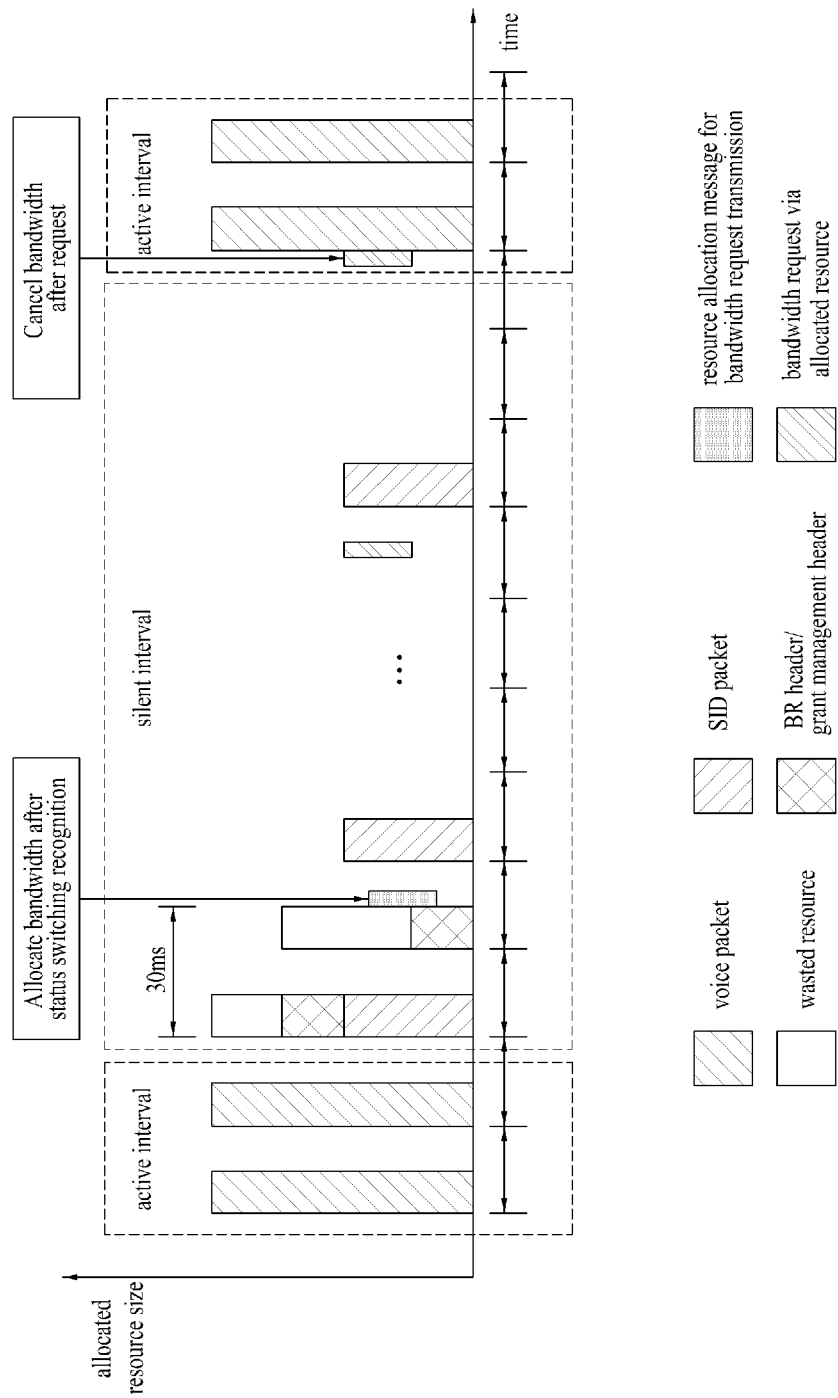
FIG. 6 is a diagram for a case that a base station recognizes a silent interval entry of a mobile station if failing in receiving a voice packet during 30 ms after reception of a last voice packet.

FIG. 6 is a diagram for a case that a base station recognizes a silent interval entry of a mobile station if failing in receiving a voice packet during 30 ms after reception of a last voice packet.

Referring to FIG. 6, if a mobile station enters a silent interval, it transmits not a voice packet but an SID packet and a BR or grant management header. Thereafter, if a base station does not receive a voice packet during 30 ms, it recognizes that the mobile station has entered the silent interval, stops allocating a radio resource for a data transmission, and allocates a radio resource for a bandwidth request transmission.

Figure 7:
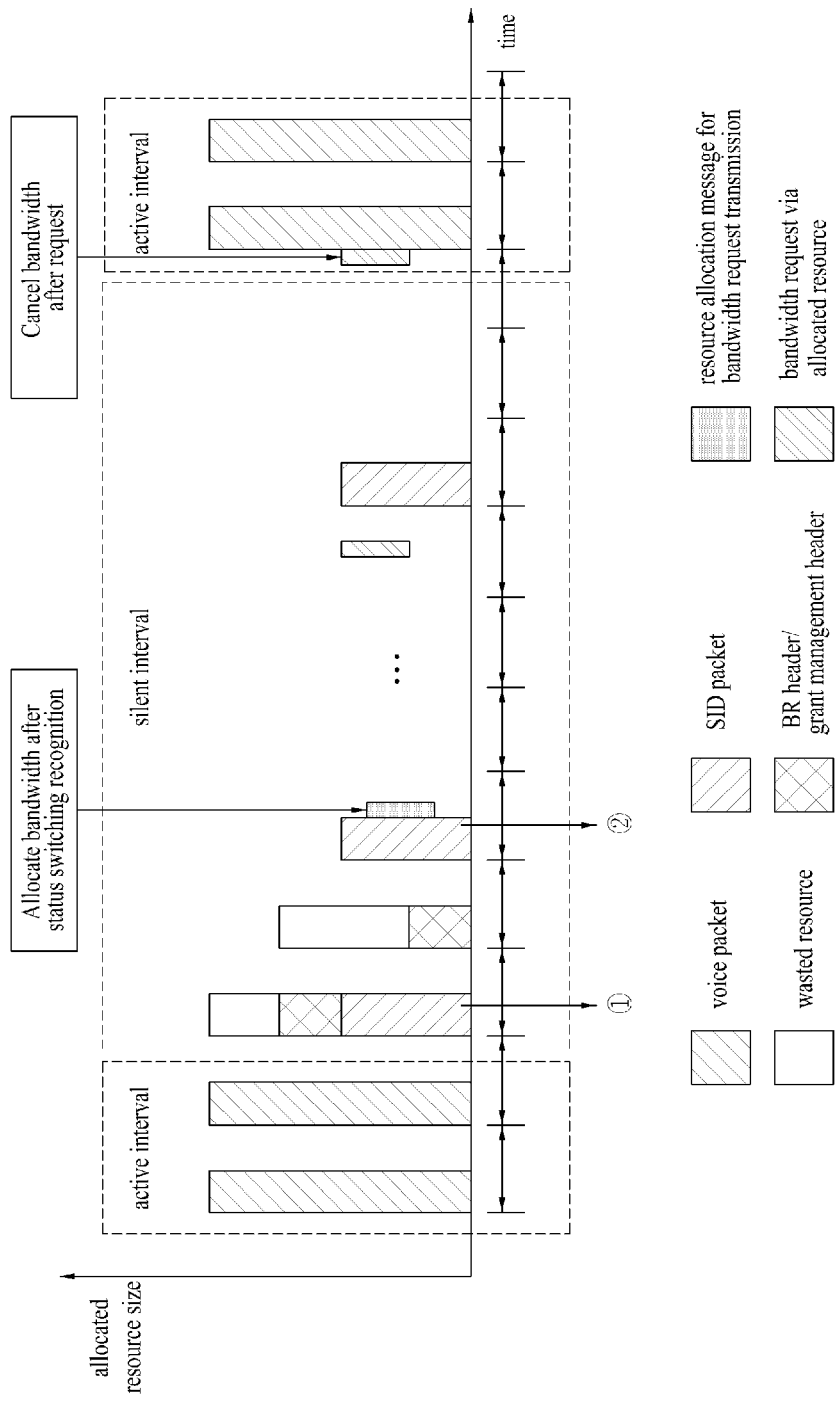
FIG. 7 is a diagram for a case that a base station recognizes a silent interval entry of a mobile station if receiving SID packets 2 times consecutively after reception of a last voice packet.

FIG. 7 is a diagram for a case that a base station recognizes a silent interval entry of a mobile station if receiving SID packets 2 times consecutively after reception of a last voice packet.

Referring to FIG. 7, if a mobile station enters a silent interval from an active interval, it transmits not a voice packet but an SID packet and a BR or grant management header. Thereafter, if a base station receives SID packets two times consecutively, it recognizes that the mobile station has entered the silent interval, stops allocating a radio resource for a data transmission, and allocates a radio resource for a bandwidth request transmission. Since the SID packet is much smaller than the voice packet, the base station is able to recognize that the received packet is the SID packet using a packet size.

A base station is able to recognize that a mobile station has entered a silent interval through a signaling on a service flow parameter set change received from the mobile station.

A base station is able to recognize that a mobile station has entered a silent interval through an index of a service flow parameter set the mobile station attempts to change. A base station is able to recognize that a mobile station has entered a silent interval through a value of a parameter of a service flow parameter set the mobile station attempts to change. If a grant or polling period of a service flow parameter set a mobile station attempts to change is 0, a base station is able to recognize that the mobile station has entered a silent interval.

Referring now to FIG. 4, if the base station recognizes that the mobile station has entered the silent interval from the active interval, the base station allocates a radio resource for a bandwidth request transmission to the mobile station [S420]. In this case, the radio resource is a channel resource necessary for the mobile station to request an uplink resource to transmit uplink data. For example, the radio resource includes a bandwidth request code (BR code) and a specific position in time-frequency domain or can correspond to a time-frequency domain on an uplink frame.

In a wireless communication system using multiple carriers, a radio resource in time-frequency domain is a set of contiguous subcarriers and a rectangular region partitioned by a symbol on a time axis and a subcarrier on a frequency axis is called a radio resource unit (RU).

A bandwidth request transmitted by a mobile station to a base station to request a radio resource allocation. The bandwidth request can be transmitted via a bandwidth request indicator and a quick access message or a bandwidth request message. And, the bandwidth request includes information on a necessary uplink radio resource. In this case, the bandwidth request indicator can include a bandwidth request indicator allocated by the base station.

A bandwidth is a channel resource necessary for a mobile station to transmit data to a base station. And, the bandwidth can be defined in time-frequency domain.

If a mobile station has data to transmit during a silent interval, it has to transmit a bandwidth request. In order to transmit the bandwidth request, a radio resource is necessary. Therefore, according to an embodiment of the present invention, as a radio resource necessary for a mobile station to transmit a bandwidth request is allocated in advance in the step S420, the mobile station operates in a non-contention mode to reduce a time taken for the mobile station to transmit the bandwidth request.

A base station allocates a radio resource for a bandwidth request transmission to a mobile station by each n*period (T). In this case, 'n' is a period control variable. If n is 1, the base station allocates the radio resource for the bandwidth request transmission to the mobile station by each transmission period or polling period (T) of a service received by the mobile station.

A base station allocates a radio resource in a same region to a single mobile station only or is able to allocate a radio resource in a same region to a plurality of mobile stations. A scheme of allocating a single radio resource to a single mobile station is called a dedicated scheme or non-contention based scheme. And, a scheme of allocating a single radio resource to a plurality of mobile stations is called a subset contention based scheme.

A base station is able to allocate a radio resource at a random point of a silent interval as well as a point of recognizing that a mobile station has entered the silent interval.

The base station receives the bandwidth request from the mobile station via the radio resource allocated to the mobile station in the step S420 [S430]. In particular, the base station transmits the bandwidth request including the allocated bandwidth request code via the allocated position of the radio resource.

When the base station receives the bandwidth request code via the allocated radio resource from the mobile station, the base station is able to receive the information related to the bandwidth request together with the bandwidth request code. In this case, the bandwidth request related information includes at least one of QoS index (quality of service index), QoS ID (QoS identification), a flow ID, a scheduling service type, a BR size (bandwidth request size), a service flow parameter set index and a service type.

In the following description, a case that a base station receives a scheduling service type and a bandwidth request size from a mobile station together with a bandwidth request code is explained with reference to FIG. 8. A case that a base station receives a flow ID and a service flow parameter set index from a mobile station together with a bandwidth request code is explained with reference to FIG. 9. A method for a mobile station to transmit a bandwidth request by modifying bandwidth request related information transmitted together with a bandwidth request code to be suitable for a situation is explained with reference to FIG. 10. And, when a base station allocates a single radio resource to a plurality of mobile stations, a case for a mobile station to transmit a mobile station ID (MS-ID) together with a bandwidth request code is explained with reference to FIG. 11.

Figure 8:
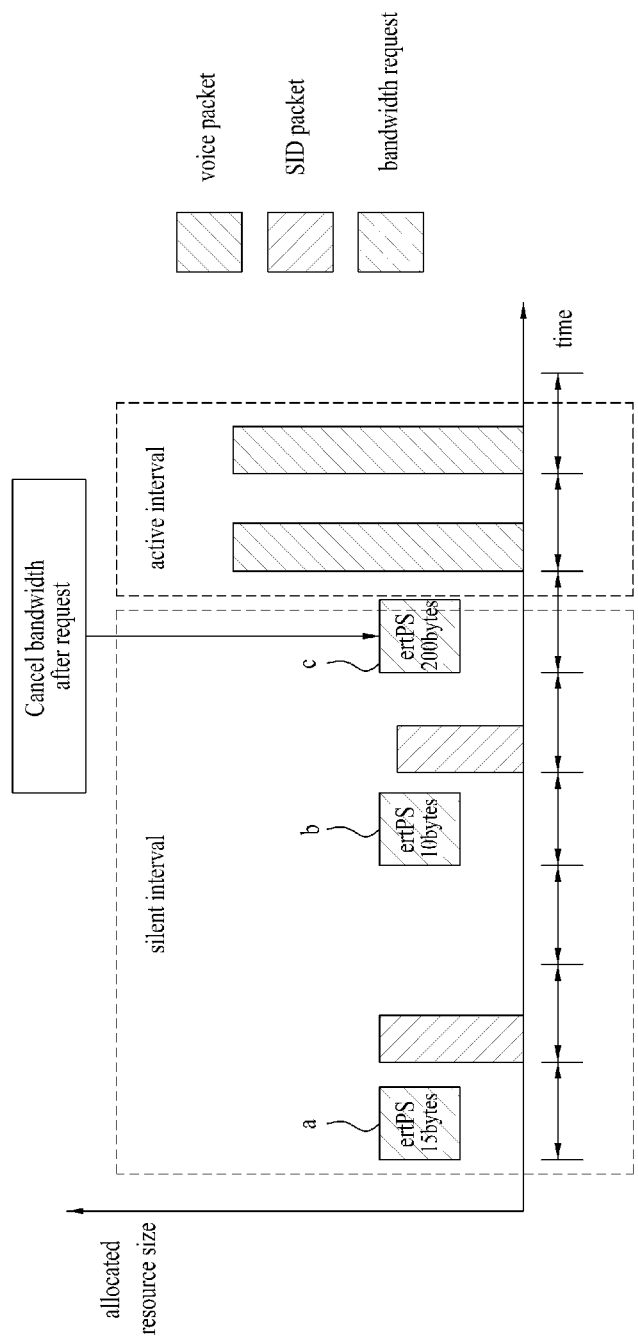
FIG. 8 is a diagram for a case that a base station receives a scheduling service type and a bandwidth request size together with a bandwidth request code from a mobile station.

FIG. 8 is a diagram for a case that a base station receives a scheduling service type and a bandwidth request size together with a bandwidth request code from a mobile station.

Referring to FIG. 8, a mobile station transmits a scheduling service type and a bandwidth request size via an allocated radio resource. Regarding the scheduling service type, a wireless communication system classifies various application services into 5 kinds of types to perform an uplink radio resource request and a corresponding radio resource allocation efficiently. And, 5 kinds of grant scheduling types include an unsolicited grant service (UGS), a real-time polling service (rtPS), an extended-real-time polling service (ertPS), a non-real-time polling service (nrtPS) and a best effort (BE).

In particular, a mobile station transmits an information indicating that a scheduling service type of the mobile station is the ertPS and an information indicating that a size of a requested bandwidth is 15 bytes via a first allocated radio resource (a), receives an allocation of a 15-byte radio resource from a base station, and then transmits SID packet via the allocated radio resource. The mobile station transmits an information indicating that a scheduling service type of the mobile station is the ertPS and an information indicating that a size of a requested bandwidth is 10 bytes via a second allocated radio resource (b), receives an allocation of a 10-byte radio resource from the base station, and then transmits SID packet via the allocated radio resource. The mobile station transmits an information indicating that a scheduling service type of the mobile station is the ertPS and an information indicating that a size of a requested bandwidth is 200 bytes via a third allocated radio resource (c), receives an allocation of a 200-byte radio resource from a base station, and then transmits voice packets via the allocated radio resource.

While a mobile station receives a service in which a transmission data size frequently varies, it is preferable that the mobile station transmits a scheduling service type and a bandwidth request size via an allocated radio resource as shown in FIG. 8.

Instead of a scheduling service type, the mobile station is able to transmit at least one of a QoS index, a QoS ID, a flow ID and a service type (e.g., a delay sensitive service, a delay tolerant service, etc.). In doing so, the mobile station is able to receive an allocation of a radio resource from the base station by the same procedure shown in FIG. 8.

Figure 9:
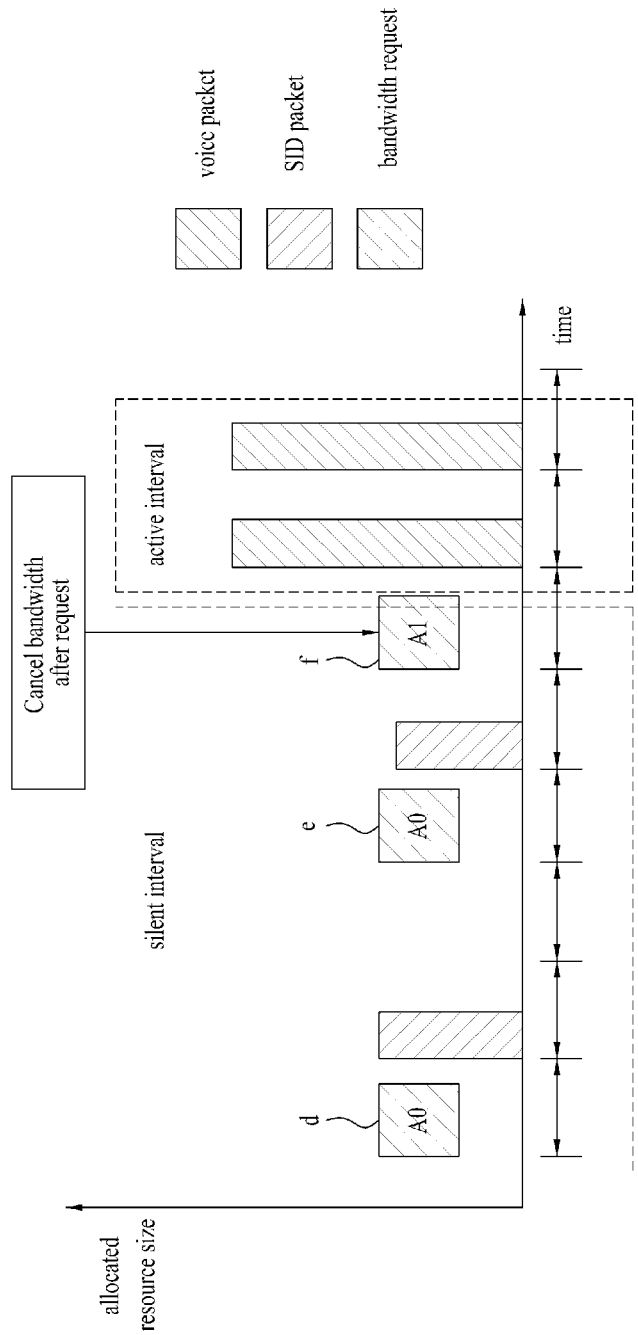
FIG. 9 is a diagram for a case that a base station receives a flow ID and a service flow parameter set index together with a bandwidth request code from a mobile station.

FIG. 9 is a diagram for a case that a base station receives a flow ID and a service flow parameter set index together with a bandwidth request code from a mobile station.

First of all, a base station is able to recognize a size of a bandwidth requested by a mobile station via an index of a service flow parameter set. Alternatively, a size information can be explicitly included.

Referring to FIG. 9, a mobile station transmits a flow ID A and an index 0 of a service flow parameter set via a first allocated radio resource (d) and a second allocated radio resource (e) of a silent interval. In this case, an index of a service flow parameter set for SID packet is 0 and an index of a service flow parameter set for voice packet is 1. And, the mobile station receives an allocation of a radio resource for transmitting SID packet from a base station and then transmits the SID packet via the allocated radio resource.

The mobile station transmits a flow ID A and an index 1 of a service flow parameter set via a third allocated radio resource (e) of the silent interval. And, the mobile station receives an allocation of a radio resource for transmitting voice packet from the base station and then transmits the voice packet via the allocated radio resource.

Since the service flow parameter set should exist as many as the number of the transmission data size variations, when the mobile terminal is receiving a service of which transmission data size barely varies, it is preferable that a flow ID and an index of the service flow parameter set are transmitted via the allocated radio resource as shown in FIG. 9.

Instead of the flow ID, the mobile station is able to at least one of a QoS index, a QoS ID, a scheduling service type and a service type. In doing so, the mobile station is able to receive an allocation of a radio resource from the base station by the same procedure shown in FIG. 9.

FIG. 10(a) and FIG. 10(b) show data formats of bandwidth request related information. FIG. 10(a) is a diagram for a case that a bandwidth request related information received by a base station together with a bandwidth request code from a mobile station varies in accordance with an identifier. And, FIG. 10(b) is a diagram for a case that a bandwidth request related information received by a base station together with a bandwidth request code from a mobile station varies in accordance with a scheduling service type.

In FIG. 10(a) and FIG. 10(b), a bandwidth request related information is able to include at least one of a scheduling service type, a QoS index, a QoS ID, a flow ID and a service type.

In accordance with an identifier, a bandwidth request related information transmitted by a mobile station together with a bandwidth request code can be set to vary. FIG. 10(a) shows an example of transmitting a bandwidth request size if an identifier is set to 0. And, FIG. 10(a) shows an example of transmitting an index of a service flow parameter set if an identifier is 1.

In accordance with a scheduling service type, a bandwidth request related information transmitted by a mobile station together with a bandwidth request code can be set to vary. FIG. 10(b) shows an example of transmitting a bandwidth request size if a scheduling service type is ertPS. And, FIG. 10(b) shows an example of transmitting an index of a service flow parameter set if a scheduling service type is USG.

Although FIG. 10(b) shows a case that a bandwidth request related information received by a base station from a mobile station together with a bandwidth request code is differentiated in accordance with a scheduling service type, a bandwidth request related information received by a base station from a mobile station together with a bandwidth request code can be differentiated in accordance with a QoS index, a QoS ID, a flow ID or a service type.

If a transmitted bandwidth request related information is differentiated in accordance with an identifier or a scheduling service type, as shown in FIG. 10(a) or FIG. 10(b), it is able to flexibly cope with a variation of a data size. In particular, if a data size variation is big, a mobile station can transmit a bandwidth request size. If a data size variation is small, a mobile station can transmit an index of a service flow parameter set.

Figure 11:
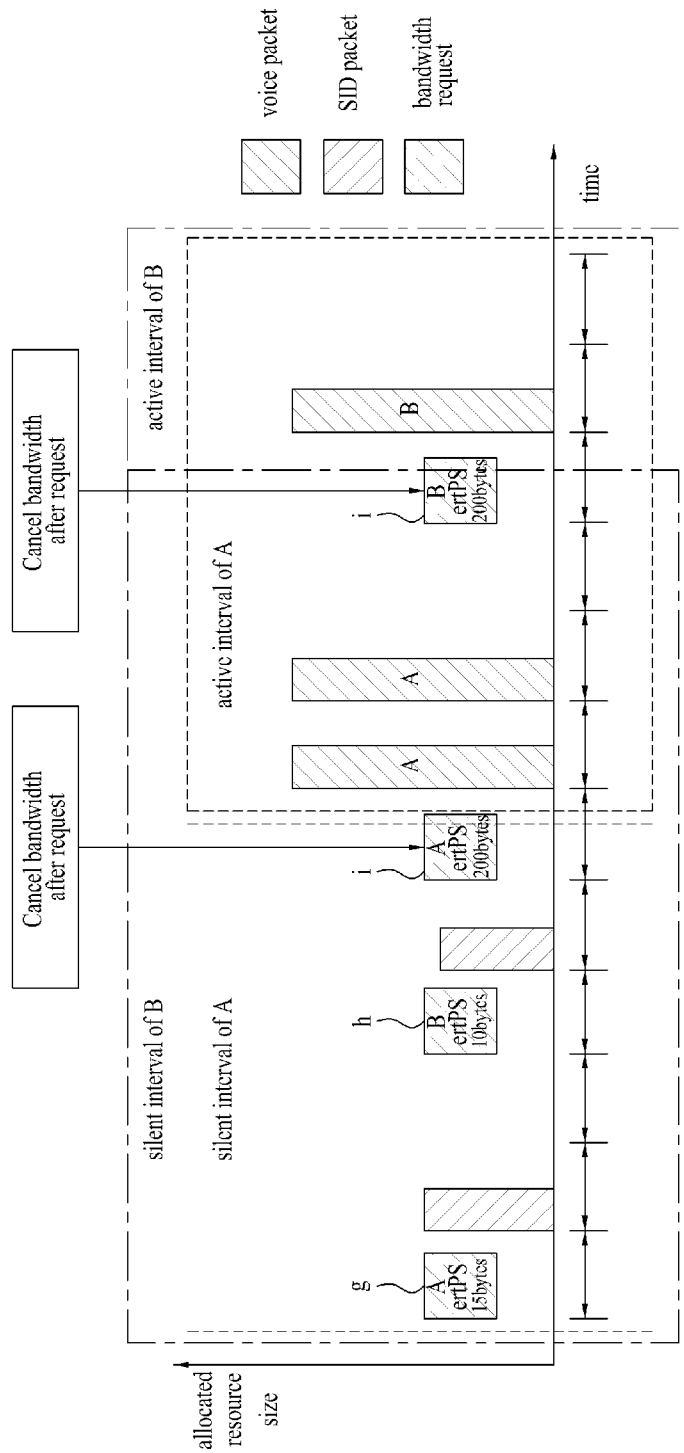
FIG. 11 is a diagram for a case that a base station receives a mobile station ID together with a bandwidth request code from a mobile station by means of allocating a same radio resource to two mobile stations.

FIG. 11 is a diagram for a case that a base station receives a mobile station ID together with a bandwidth request code from a mobile station by means of allocating a same radio resource to two mobile stations.

In case that a base station allocates a single radio resource to a single mobile station, the mobile station needs not to transmit a mobile station ID when the mobile station makes a request for a bandwidth to the base station. On the contrary, in case that a base station allocates a single radio resource to a plurality of mobile stations, a prescribed one of the mobile stations should transmit a mobile station ID to the base station. Therefore, the base station checks the corresponding mobile station ID and is then able to recognize that which of the mobile stations makes a request for a radio resource. In this case, the mobile station ID can include one of a full mobile station ID (full MS-ID) and a partial mobile station ID (partial MS-ID).

Since different mobile stations can have a same partial mobile station ID, when a base station allocates a radio resource for a bandwidth request transmission to a mobile station in the step S420 shown in FIG. 4, only if different radio resources are allocated to the mobile stations having the same partial mobile station ID, respectively, the corresponding mobile station is able to transmit the partial mobile station on making a request for a bandwidth in the step S430 shown in FIG. 4.

Referring to FIG. 11, a mobile station A transmits a mobile station ID A, a scheduling service type ertPS and a requested bandwidth size of 15 bytes via a first allocated radio resource g of a silent interval, receives an allocation of a 15-byte radio resource from a base station, and then transmits SID packet via the allocated radio resource.

And, a mobile station B transmits a mobile station ID B, a scheduling service type ertPS and a requested bandwidth size of 10 bytes via a second allocated radio resource h of the silent interval, receives an allocation of a 10-byte radio resource from the base station, and then transmits SID packet via the allocated radio resource.

Moreover, the mobile station A transmits the mobile station ID A, the scheduling service type ertPS and a requested bandwidth size of 200 bytes via a third allocated radio resource i of the silent interval, receives an allocation of a 200-byte radio resource from the base station, transmits voice packets via the allocated radio resource, and then enters an active interval. After the mobile station A has entered the active interval, the mobile station A cancels the radio resources allocated to both of the mobile station A and the mobile station B so that the allocated radio resource can be used by the mobile station B only.

Thereafter, the mobile station B transmits the mobile station ID B, the scheduling service type ertPS and a requested bandwidth size of 200 bytes via an allocated radio resource j of the silent interval, receives an allocation of a 200-byte radio resource from the base station, transmits voice packets via the allocated radio resource, and then enters an active interval.

Referring now to FIG. 4, having received the bandwidth request from the mobile station, the base station allocates a bandwidth to the mobile station [S440].

In particular, as shown in FIG. 8, FIG. 9 or FIG. 11, the base station allocates the bandwidth amounting to the bandwidth size requested by the mobile station to the corresponding mobile station.

Yet, in case that a single radio resource is allocated to a plurality of mobile stations, a plurality of the mobile stations can request bandwidths via the same radio resource simultaneously. For this case, a method for a base station to allocate a bandwidth is described with reference to FIG. 12 as follows.

Figure 12:
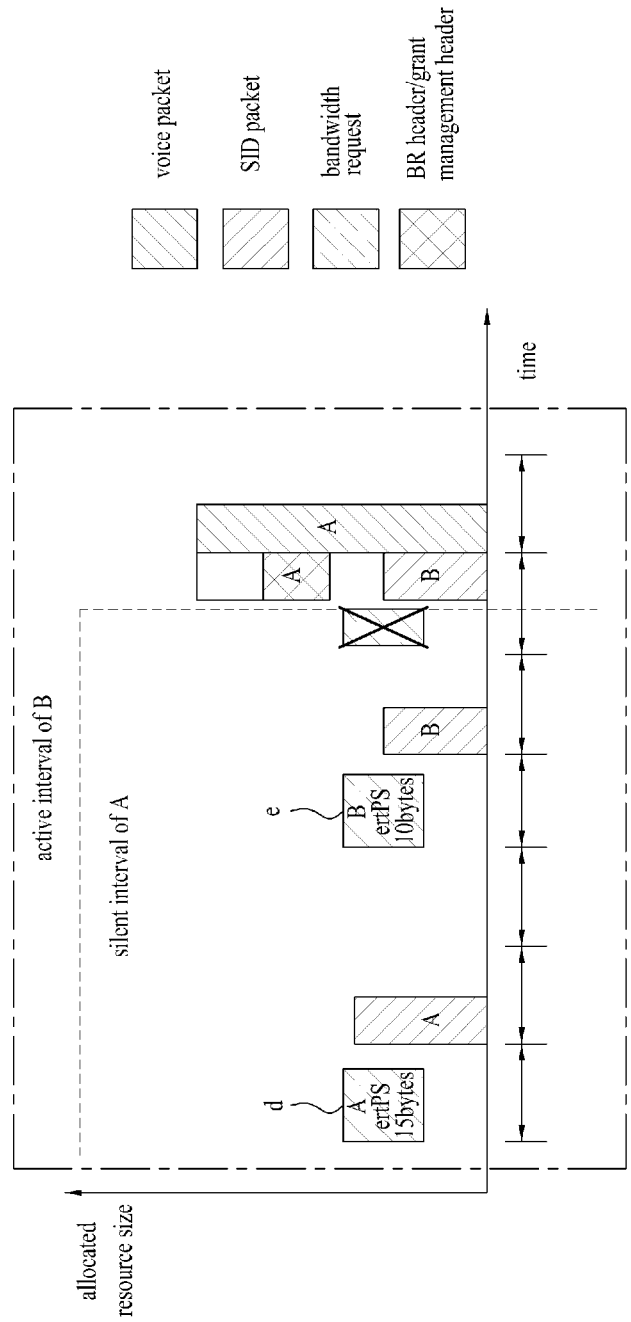
FIG. 12 is a diagram for a case that two mobile stations simultaneously make a request for a bandwidth via a same radio resource when a base station allocates the same radio resource to the two mobile stations.

FIG. 12 is a diagram for a case that two mobile stations simultaneously make a request for a bandwidth via a same radio resource when a base station allocates the same radio resource to the two mobile stations.

Referring to FIG. 12, if two mobile stations simultaneously request bandwidths via a same radio resource, the bandwidth request messages sent by the two mobile stations are damaged. Therefore, a base station is unable to recognize a bandwidth size requested by each of the two mobile stations.

If so, the base station allocates bandwidths to all mobile stations, to which the same radio resource is allocated, respectively. In this case, a size of the allocated bandwidth can correspond to one of a size capable of transmitting a signaling header for a bandwidth request, a MAC sub-header or a bandwidth request (BR) header, a size of SID packet most recently transmitted by the corresponding mobile station, a size of voice packet, and a size previously determined in consideration of a size of maximum SID packet.

FIG. 12 shows a case of allocating a bandwidth of a size of SID packet most recently transmitted by a corresponding mobile station. In FIG. 12, a base station simultaneously receives bandwidth requests from a mobile station A and a mobile station B via a same radio resource. The base station allocates a bandwidth of 15 bytes amounting to a size of SID packet most recently transmitted by the mobile station A. And, the base station allocates a bandwidth of 10 bytes amounting to a size of SID packet most recently transmitted by the mobile station B.

If so, the mobile station A transmits a bandwidth header or a grant management header to request a bandwidth for transmitting a voice packet via the allocated bandwidth, receives a bandwidth capable of transmitting the voice packet, and then transmits the voice packet. And, the mobile station B transmits SID packet via the allocated bandwidth.

In the following description, when a mobile station does not have related information included in a request, a case that a base station allocated a bandwidth of a previously determined size is explained with reference to FIG. 13 and FIG. 14. In this case, a corresponding size can be defined in consideration of a maxim SID size.

Figure 13:
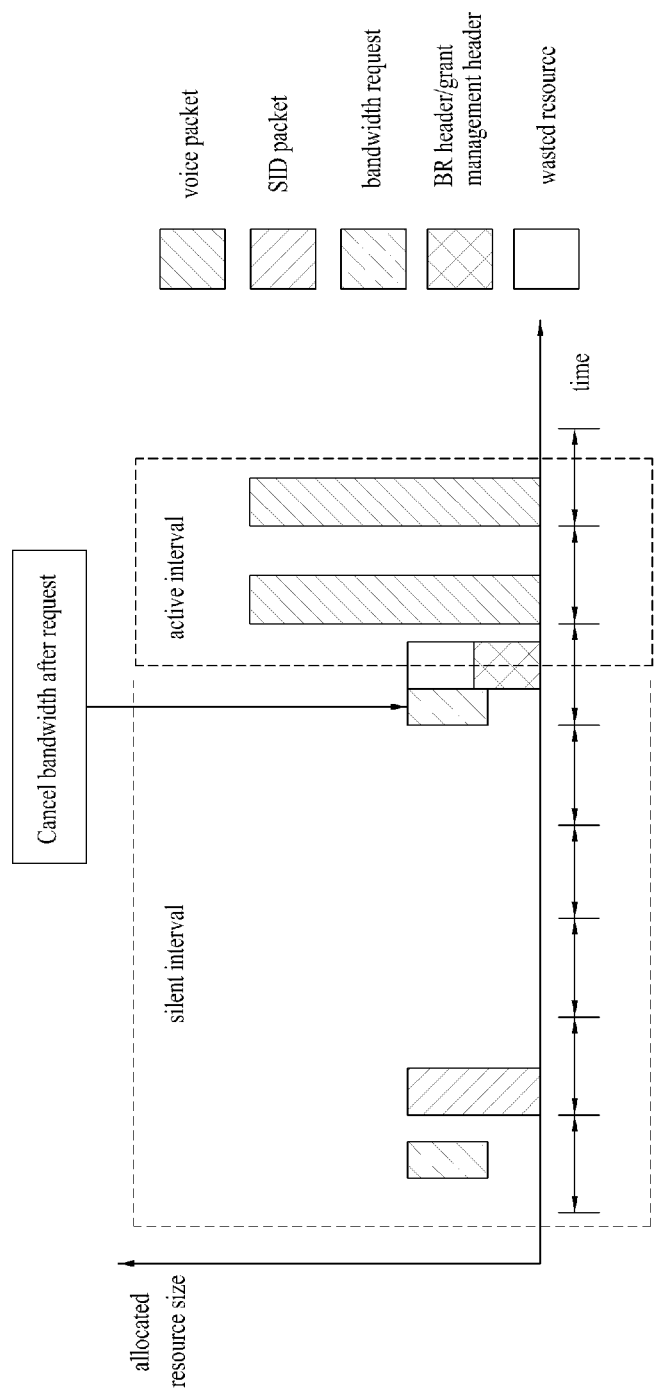
FIG. 13 is a diagram for a case that a base station allocates a bandwidth of a previously determined size in case of allocating a single radio resource to a single mobile station.

FIG. 13 is a diagram for a case that a base station allocates a bandwidth of a previously determined size in case of allocating a single radio resource to a single mobile station. And, FIG. 14 is a diagram for a case that a base station allocates a bandwidth of a previously determined size in case of allocating a single radio resource to two mobile stations.

In FIG. 13, if a base station receives a bandwidth request from a mobile station, a base station allocates a bandwidth of a previously determined size. When the mobile station transmits SID packet, the mobile station transmits the SID packet via the allocated bandwidth. When the mobile station transmits voice packet, the mobile station transmits a bandwidth request header or a grant management header for requesting a bandwidth to transmit the voice packet via the allocated bandwidth, receives the bandwidth capable of transmitting the voice packet, and then transmits the voice packet via allocated bandwidth.

Figure 14:
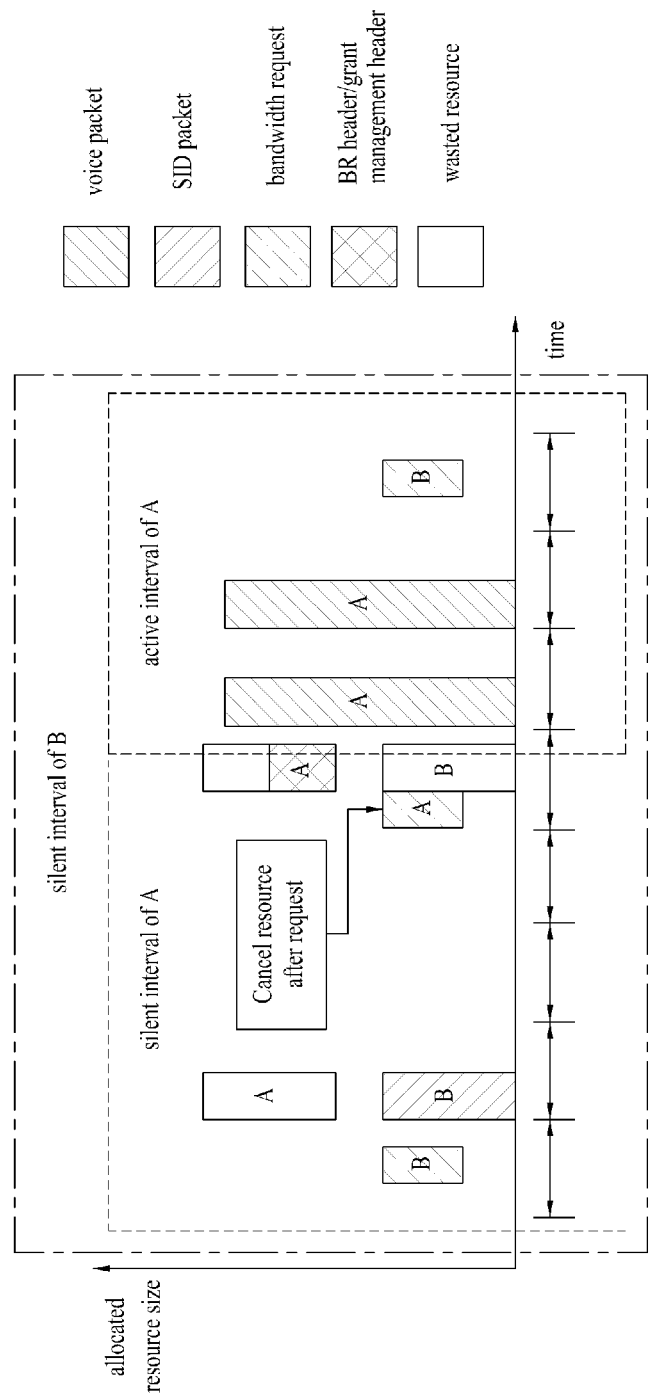
FIG. 14 is a diagram for a case that a base station allocates a bandwidth of a previously determined size in case of allocating a single radio resource to two mobile stations.

In FIG. 14, if a base station receives a bandwidth request via a specific radio resource, the base station allocates a bandwidth of a predetermined size to all mobile stations to which the specific radio resource has been allocated.

Referring to FIG. 14, since a base station having received a bandwidth request is unable to know which mobile station has transmitted the bandwidth request, the base station allocates a bandwidth of a predetermined size to each of a mobile station A and a mobile station B. If so, the mobile station A does not transmit anything via the allocated bandwidth but the mobile station B transmits SID packet via the allocated bandwidth.

In case that the mobile station A requests a bandwidth to transmit a voice packet, the base station allocates a bandwidth of a predetermined size to each of the mobile station A and the mobile station B. If so, the mobile station A transmits a bandwidth request header or a grant management header, which is to request a bandwidth for transmitting a voice packet, via the allocated bandwidth, receives an allocation of the bandwidth for transmitting the voice packet, and then transmits the voice packet. On the other hand, the mobile station B transmits nothing via the allocated bandwidth.

Thereafter, if the mobile station does not need the radio resource for the bandwidth request transmission any more, the radio resource for the bandwidth request transmission is cancelled.

If the mobile station requests the bandwidth for transmitting the voice data, the base station recognizes that the mobile station has entered an active interval from a silent interval. Thereafter, the radio resource is cancelled right after the base station has recognized the active interval entry of the mobile station or after predetermined duration from the recognition of the active interval entry of the mobile station.

Alternatively, the base station forces the radio resource to be cancelled and then notifies the cancellation to the mobile station.

Figure 15:
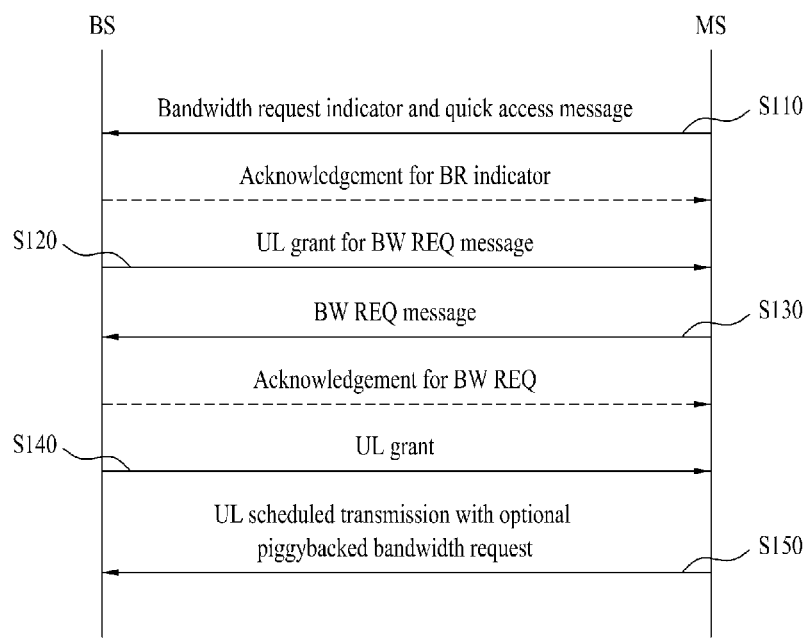
FIG. 15 is a diagram for an uplink resource requesting process in a wireless communication system according to an embodiment of the present invention.

In the following description, an uplink resource requesting method in a wireless communication system according to an embodiment of the present invention is explained. FIG. 15 is a diagram for an uplink resource requesting process in a wireless communication system according to an embodiment of the present invention.

In an uplink resource requesting method in a wireless communication system according to an embodiment of the present invention, a base station supports a 5-step scheme and a 3-step scheme that is a quick access scheme. The 3-step scheme is a scheme of performing the steps S110, S140 and S150 shown in FIG. 15. And, the 5-step scheme is a scheme of performing all the steps S110 to S150. The 5-step scheme is usable independently from the 3-step scheme or can be used as a scheme substitutive for the 3-step scheme.

Referring to FIG. 15, in the 3-step scheme, a mobile station transmits a bandwidth request indicator and a quick access message to a base station [S110].

In doing so, a format of the quick access message can be set different in accordance with a property of data the mobile station is going to transmit. Therefore, the quick access message according to an embodiment of the present invention includes a field indicating the property of the data the mobile station is going to transmit and the rest of fields are determined in accordance with the field indicating the property of the data the mobile station is going to transmit. The formats of the quick access message according to the embodiment of the present invention are described with reference to FIGS. 16 to 19.

First of all, a first format of a quick access message according to an embodiment of the present invention is described with reference to FIG. 16.

FIG. 16(a) is a diagram for a first format of a quick access message according to an embodiment of the present invention if data to be transmitted by a mobile station is a delay sensitive service, and FIG. 16(b) is a diagram for a first format of a quick access message according to an embodiment of the present invention if data to be transmitted by a mobile station is a delay tolerant service.

Referring to FIG. 16(a) and FIG. 16(b), a format of a quick access message can be configured in a manner of being determined in accordance with a service type and priority of data a mobile station is going to transmit. In particular, a format of the quick access message can be configured in a following manner. First of all, in case that a service type of data to be transmitted by a mobile station is a delay sensitive service, a quick access message includes a mobile station ID (Station ID). Secondly, in case that a service type of data to be transmitted by a mobile station is a delay tolerant service, a quick access message includes a size of a resource (request size) requested by the quick access message. In case of the delay sensitive service, since a mobile station and a base station have already negotiated about a size and allocation period of a resource to be allocated, it is important for the mobile station to inform the base station of the mobile station ID. In case of the delay tolerant service, it is important for the mobile station to inform the base station of a size of a requested resource.

Table 1 shows a service type and priority of data to be transmitted by a mobile station.

TABLE 1

| Value | Service type | Priority |
|---|---|---|
| 00 | Delay sensitive service | High |
| 01 | Delay sensitive service | Low |
| 10 | Delay tolerant service | High |
| 11 | Delay tolerant service | Low |

Referring to Table 1, a service type and priority of data to be transmitted by a mobile station can be represented as 2 bits. In FIG. 16(a) and FIG. 16(b), a value shown in Table 1 is inserted in a field 'service type/priority'. If the 'service type/priority' is set to 00 or 01, a quick access message includes a mobile station ID (Station ID) and a cyclic redundancy check (hereinafter abbreviated 'CRC') as shown in FIG. 16(a). If the 'service type/priority' is set to 10 or 11, a quick access message includes a size (request size) of a requested resource and a CRC as shown in FIG. 16(b).

Only if data to be transmitted is a periodically transmitted voice related service, a mobile station is able to set the field 'service type/priority' to '00'.

In case of a voice emergency service, a mobile station is able to set the field 'service type/priority' to '00'. In case of an SMS emergency service, a mobile station is able to set the field 'service type/priority' to '01' or '10'.

If a base station and a mobile station agree to use a first format of a quick access message according to an embodiment of the present invention, if a field 'service type/priority' of a quick access message received from the mobile station is set to 00 or 01, the base station determines that the quick access message includes a field 'Station ID' and a field 'CRC'. If a field 'service type/priority' of a quick access message received from the mobile station is set to 10 or 11, the base station determines that the quick access message includes a field 'service type/priority', a field 'Request size' and a field 'CRC'. If the field 'service type/priority' of the received quick access message is set to '00', the base station is able to allocate a resource by period according to a flow QoS parameter of a corresponding service among flows retained by the mobile station having sent the quick access message.

In the following description, a second format of a quick access message according to an embodiment of the present invention is described with reference to FIG. 17.

FIG. 17(a) is a diagram for a second format of a quick access message according to an embodiment of the present invention if a bandwidth request type (hereinafter abbreviated 'BR type') of data to be transmitted by a mobile station is set to 0. And, FIG. 17(b) is a diagram for a second format of a quick access message according to an embodiment of the present invention if a BR type of data to be transmitted by a mobile station is set to 0.

BR type can be defined in accordance with the number of flows of data to be transmitted and whether data properties of a plurality of flows are similar in case of attempting to transmit a plurality of the flows. In particular, if the flow number of data to be transmitted by a mobile station is 1 or if a plurality of flows exist and data properties of a plurality of the flows are similar, the BR type is set to 0. If a plurality of flows of data to be transmitted by a mobile station exists and data properties of a plurality of flows are not similar, it is able to set the BR type to 1.

Table 2 shows a filed included in a quick access message in accordance with BR Type according to an embodiment of the present invention.

TABLE 2

| BR Type | Filed included in a quick access message |
|---|---|
| 0 | QoS ID |
| 1 | Station ID |

Referring to FIG. 17(a), if BR type is set to 0, a quick access message includes QoS ID. Referring to FIG. 17(b), if BR type is set to 1, a quick access message includes Station ID.

Table 3 shows an example of QoS ID.

TABLE 3

| QoS ID | Service Type | Scheduling Type | Priority |
|---|---|---|---|
| 0 | Delay sensitive service | Emergency | High |
| 1 | Delay sensitive service | Control signaling | High |
| 2 | Delay sensitive service | UGS/ertPS | High |
| 3 | Delay sensitive service | rtPS | High |
| 4 | Delay sensitive service | rtPS | Low |
| 5 | Delay tolerant service | nrtPS | High |

TABLE 3-continued

| QoS ID | Service Type | Scheduling Type | Priority |
|---|---|---|---|
| 6 | Delay tolerant service | nrtPS/BE | Low |
| 7 | — | reserved | — |

If a base station and a mobile station agree to use a second format of a quick access message according to an embodiment of the present invention, if a field 'BR type' of a quick access message received from the mobile station is set to 0, the base station determines that the quick access message includes a field 'BR type', a filed 'QoS ID', a filed 'Request size' and a field 'CRC'. If a field 'BR type' of a quick access message received from the mobile station is set to 1, the base station determines that the quick access message includes a field 'BR type', a field 'Station ID' and a field 'CRC'.

In the second format of the quick access message according to the embodiment of the present invention, the field 'BR type' is not added. Total BR codes are divided into the BR codes, which are to be used if the flow number of data to be transmitted by a mobile station is 1 or if the flow number is plural and data properties of a plurality of flows are similar, and the BR codes, which are to be used if the flow number of data to be transmitted by a mobile station is plural and data properties of a plurality of flows are not similar. And, a base station is then able to infer a format of the quick access message with reference to the corresponding BR codes.

In the following description, a third format of a quick access message according to an embodiment of the present invention is described with reference to FIG. 18.

FIG. 18(a) is a diagram for a third format of a quick access message according to an embodiment of the present invention if data to be transmitted by a mobile station is a delay sensitive service, and FIG. 18(b) is a diagram for a third format of a quick access message according to an embodiment of the present invention if data to be transmitted by a mobile station is a delay tolerant service.

Referring to FIG. 18(a), if data to be transmitted by a mobile station is sensitive to delay, a quick access message includes a field 'BR Type', a field 'Station ID' and a field 'CRC'. Referring to FIG. 18(b), if data to be transmitted by a mobile station is not sensitive to delay, a quick access message includes a field 'BR Type', a field 'QoS ID', a field 'Request size' and a field 'CRC'.

In this case, if data to be transmitted by a mobile station is sensitive to delay, the BR type is set to 1. If data to be transmitted by a mobile station is not sensitive to delay, the BR type can be set to 0. If the BR type is 1, a base station determines that the quick access message includes the field 'BR Type', the field 'Station ID' and the field 'CRC'. If the BR type is 0, the base station determines that the quick access message includes the field 'BR Type', the field 'QoS ID', the field 'Request size' and the field 'CRC'.

Since the format shown in FIG. 18(b) is used only if data is not sensitive to delay, it is able to reduce the number of bits of the field 'QoS ID'. For instance, by setting the bit number of the field 'QoS ID' to 1, if a value of the field 'QoS ID' is 0, it indicates QoS ID 5. If a value of the field 'QoS ID' is 1, it indicates QoS ID 6.

In order to reduce the bit number required for transmitting the 'request size' shown in FIG. 16 or FIG. 4, a method for a mobile station to transmit a difference between a default value, which is determined by the mobile station and a base station, and a size of a resource requested by the mobile station to the base station is explained with reference to FIG. 19. In this case, the default value is a predetermined value as the same value for all mobile stations or can be negotiated between the mobile station and the base station in generating or modifying a service flow.

FIG. 19 is a diagram for a data format of a difference value if 'request size' shown in FIG. 16 or FIG. 4 is transmitted in a form of a difference from a default value.

In FIG. 19, a field 'type' indicates what kind of type a field 'request size' has. In this case, a type can correspond to increment/decrement or aggregate. In case that a single type s used only, the field 'type' is not necessary.

In FIG. 19, a field 'sign' is a field that indicates whether a size of a resource requested by a mobile station is a value greater (i.e., increment) or smaller (i.e., decrement) that a default value. If the filed 'sign' exists, the field 'request size' indicates a difference between the default value and the size of the resource requested by the mobile station. If the field 'sign' does not exist, the field 'request size' indicates the size of the resource requested by the mobile station.

For instance, if the size of the resource requested by the mobile station has a value greater than the default value, assume that the field 'sign' is 1. If the size of the resource requested by the mobile station has a value smaller than the default value, assume that the field 'sign' is 0. On theses assumptions, when the default value is 100 bytes, if the size of the resource requested by the mobile station is 106 bytes, the field 'sign' is '1' and the field 'request size' is 6 bytes.

In this case, a method of indicting the field 'request size' includes a general expression, a power expression or a step expression.

The general expression is a method of expressing a value to be transmitted as a binary number. For instance, if a value to be transmitted via the field 'request size' is 6 bytes, the field 'request size' is expressed as 110.

The power expression is a method of expressing an exponential as a binary number by converting a value to be transmitted to an exponential form of a previously determined value. For instance, if a previously determined value is 2 and a value to be transmitted is 64 bytes, the field 'request size' is expressed as 110 that is a binary number of 6 due to '$64=2^6$'.

The step expression is a method of expressing a multiple as a binary number by converting a value to be transmitted to a multiple form of a previously determined value. For instance, if a previously determined value is 5 and a value to be transmitted is 30 bytes, the field 'request size' is expressed as 110 that is a binary number of 6 due to '30=5*6'.

In the following description, a fourth format of a quick access message according to an embodiment of the present invention is explained. Table 4 shows one example of a fourth format of a quick access message according to an embodiment of the present invention. And, Table 5 shows another example of a fourth format of a quick access message according to an embodiment of the present invention.

TABLE 4

| field | Length(bit) | Description |
|---|---|---|
| Station ID | 10~12 | Full station identifier, Partial station identifier or new ID for BW-REQ |
| Service type/ Priority | 2 | 0b00: delay sensitive service & High<br>0b01: delay sensitive service & Low<br>0b10: delay tolerant service & High<br>0b11: delay tolerant service & Low |
| Bandwidth request size | 2 | 0b00~0b10: indicates the number of LRUs<br>0b11: toggle SF QoS parameter set for aGPS |

TABLE 5

| field | Length(bit) | Description |
|---|---|---|
| Station ID | 10~12 | Full station identifier, Partial station identifier or new ID for BW-REQ |
| Flow ID | 4 | |
| Bandwidth request size | 2 | 0b00~0b10: indicates the number of LRUs<br>0b11: toggle SF QoS parameter set for aGPS |

In Table 4, a quick access message includes a field 'Station ID', a field 'Service type/Priority' and a field 'Bandwidth request size'. In Table 5, a quick access message includes a field 'Station ID', a field 'Flow ID' and a field 'Bandwidth request size'.

In this case, 0b00, 0b01 or 0b10 in the field 'Bandwidth request size' indicates a request size. The request size can be expressed as the number logical resource units (LRUs). For instance, 0b00 indicates that a resource requested by a mobile station includes 2 LRUs. For instance, 0b01 indicates that a resource requested by a mobile station includes 3 LRUs. For instance, 0b10 indicates that a resource requested by a mobile station includes 4 LRUs. The LRU number indicated by 0b00, 0b01 or 0b10 is applicable to all mobile stations in common, is applicable to each mobile station differently, or can be differently applicable in accordance with 'service type/priority'. In this case, the definition can be determined in a DSx transaction process.

And, 'ob11' in the field 'Bandwidth request size' is usable for the purpose to change a service parameter set (SF QoS parameter set) of aGPS (adaptive grant polling service). In this case, the aGPS has two service parameter sets.

When a service type of data to be transmitted by a mobile station is aGPS, if the mobile station attempts to change a service parameter set, the mobile station sets a value of the field 'Bandwidth request size' to 0b11 and then sends a quick access message to a base station.

Having received the quick access message, in which the field 'Bandwidth request size' is set to 0b11, the base station changes the parameter set. In particular, in case that a current parameter set is set as a primary set, the primary set is changed into a secondary set. In case that a current parameter set is set as a secondary set, the secondary set is changed into a primary set.

Figure 1:
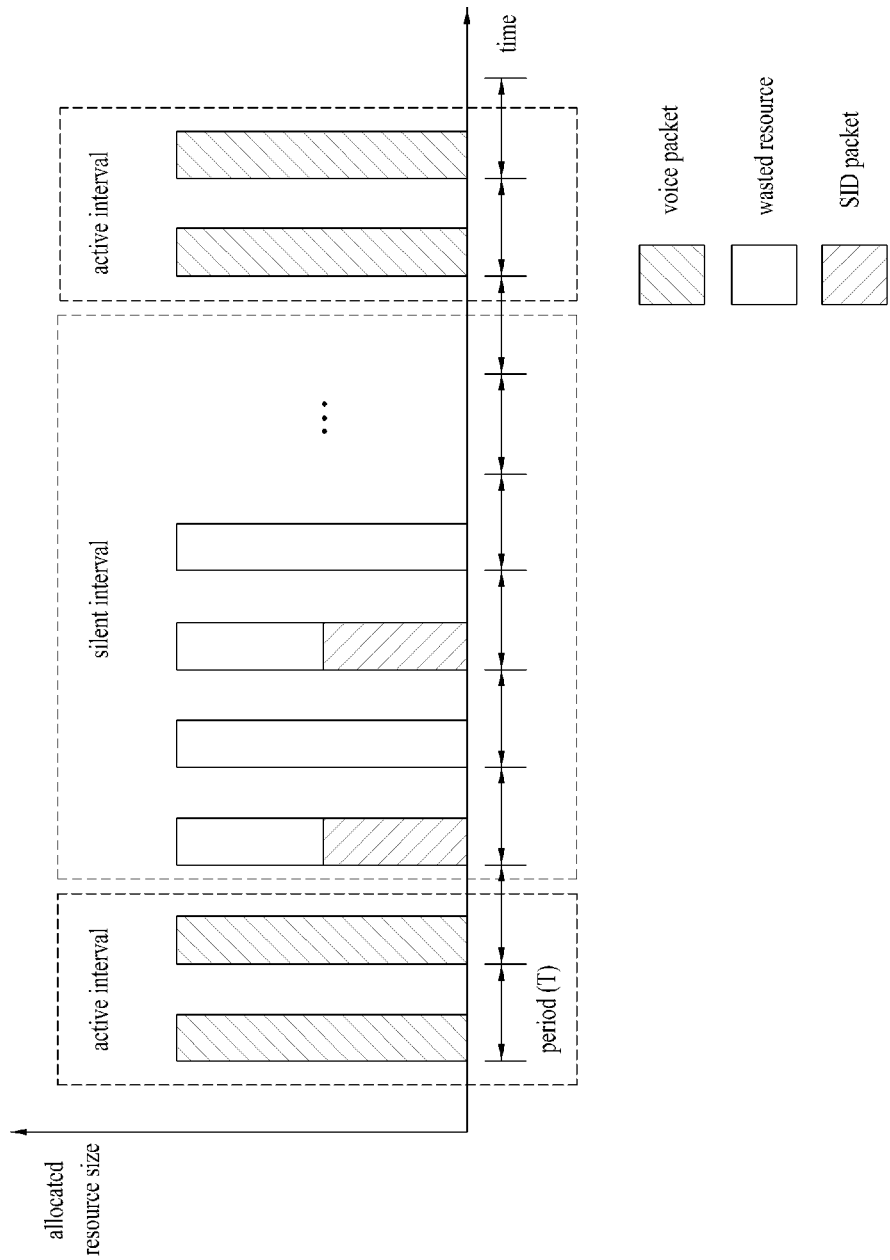
FIG. 1 is a diagram for a radio resource allocating method of an unsolicited grant service (hereinafter abbreviated USG) according to a related art.
Figure 2:
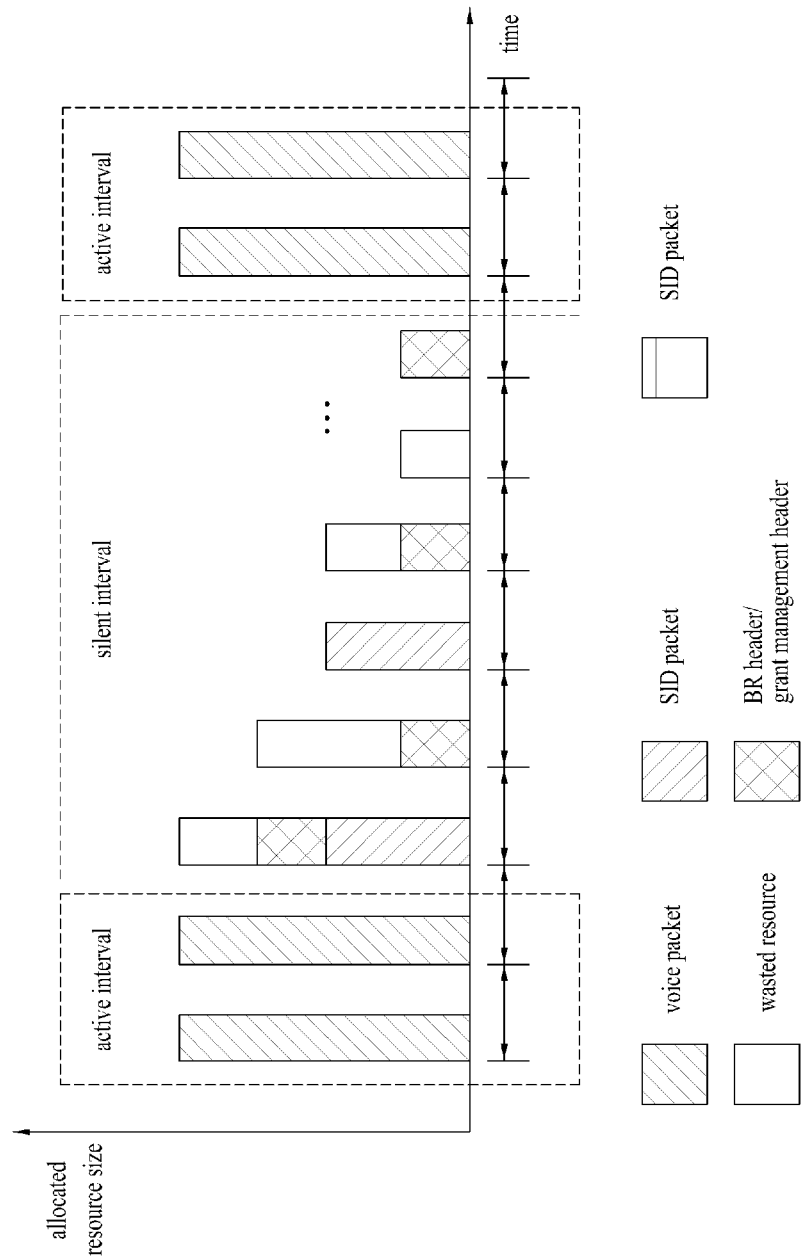
FIG. 2 is a diagram for a method of a first radio resource allocating method for an extended-real-time polling service (hereinafter named 'ertPS') according to a related art.
Figure 3:
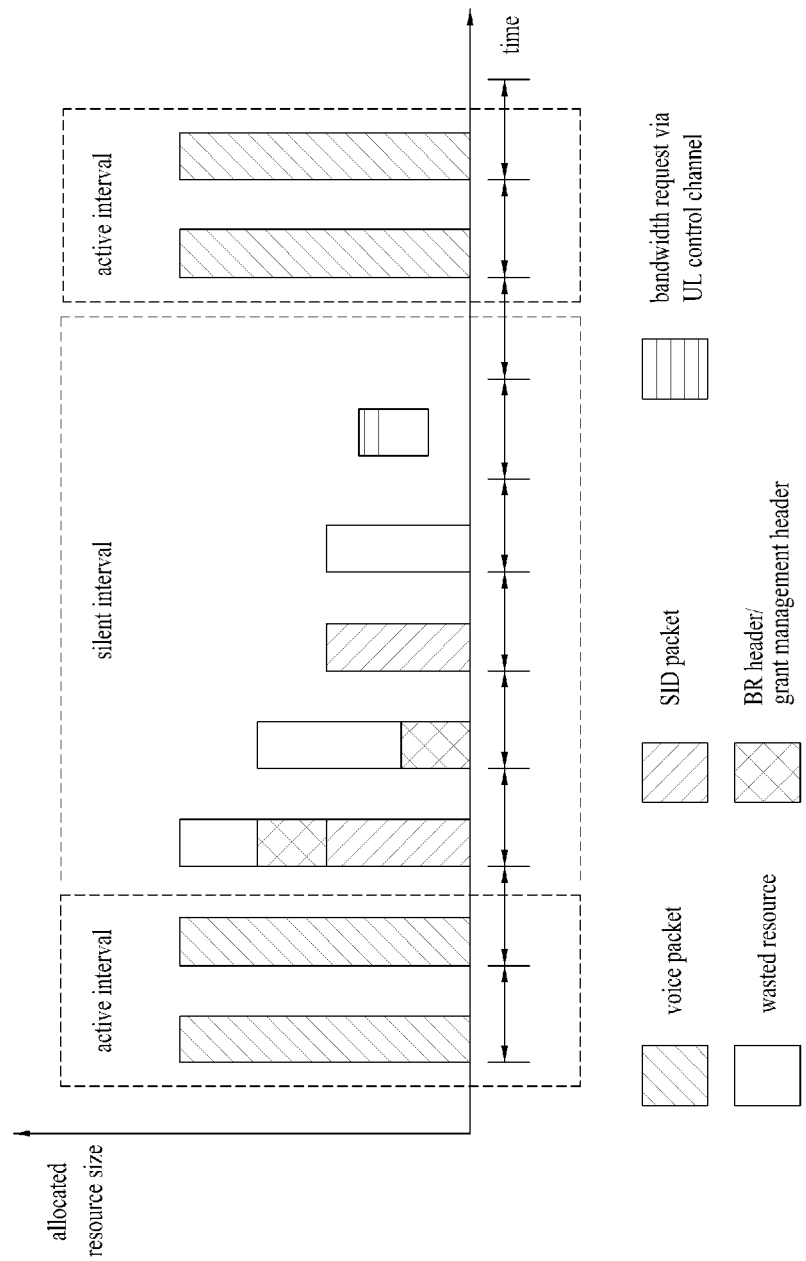
FIG. 3 is a diagram for a second radio resource allocating method for an extended-real-time polling service (hereinafter abbreviated 'ertPS') according to a related art.

Referring now to FIG. 1, the base station having received the bandwidth request indicator and the quick access message from the mobile station in the 3-step scheme allocates a bandwidth to the mobile station [S140].

In doing so, if the mobile station sends the quick access message, in which the size of the requested resource is included, the base station allocates the resource of the requested size if able to allocate the resource of size requested by the mobile station.

In case that the mobile station does not explicitly information the base station of the size of the requested resource, the base station is able to allocate the resource of a size, which is estimated using Station ID, QoS level or the like, to the mobile station.

A base station is able to allocate a resource based on a fixed size previously negotiated with a mobile station. A case that a base station allocates a resource to a mobile station based on a fixed size is described with reference to FIGS. 20 to 22.

First of all, a case that information on a size of a resource requested by a mobile station is not transmitted to a base station is described. Since the base station is not aware of the size of the resource requested by the mobile station, the base station allocates the resource of a fixed size.

Figure 20:
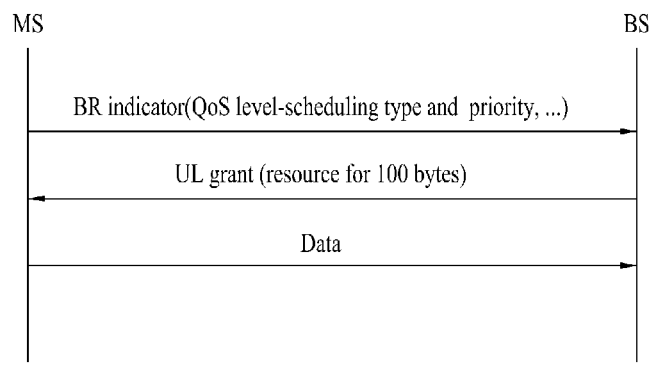
FIG. 20 is a diagram for a case that a resource necessary for a mobile station has a size smaller than a fixed size.

FIG. 20 is a diagram for a case that a resource necessary for a mobile station has a size smaller than a fixed size. In FIG. 20, assuming that a resource size actually necessary for a mobile station is 50 bytes, since a base station has no information on a size of a resource necessary for the mobile station, the base station allocates 100 bytes of a fixed size. If so, the mobile station uses 50 bytes for transmitting data and wastes the resource of 50 bytes.

Figure 21:
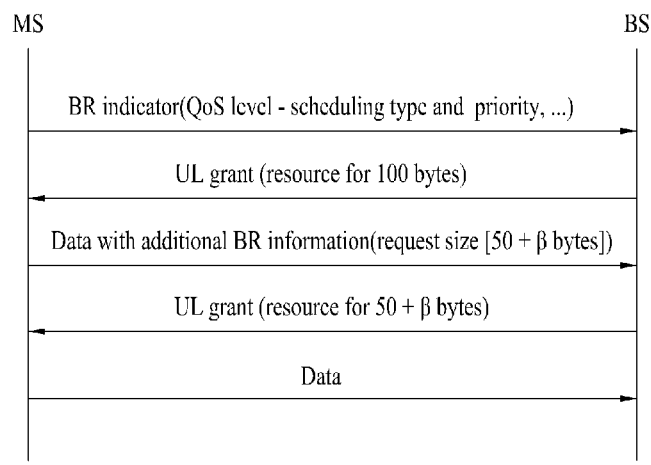
FIG. 21 is a diagram for a case that a resource necessary for a mobile station has a size greater than a fixed size.

FIG. 21 is a diagram for a case that a resource necessary for a mobile station has a size greater than a fixed size. In case that a resource necessary for a mobile station has a size greater than a fixed size, the mobile station requests an additional resource amounting to a size of data remaining after transmission.

In FIG. 21, assuming that a resource size actually necessary for a mobile station is 150 bytes, since a base station has no information on a size of a resource necessary for the mobile station, the base station allocates 100 bytes of a fixed size. If so, the mobile station transmits data to the base station together with additional bandwidth request information (additional BR information). In doing so, the mobile station makes a request for a resource of '50+size (−) of a resource used to transmit the additional BR information' bytes to the base station.

If a base station is unable to allocate a resource of a fixed size to a mobile station, the base station is able to allocate a resource of a size available for allocation to the mobile station or is able to switch to the 5-step scheme.

Figure 22:
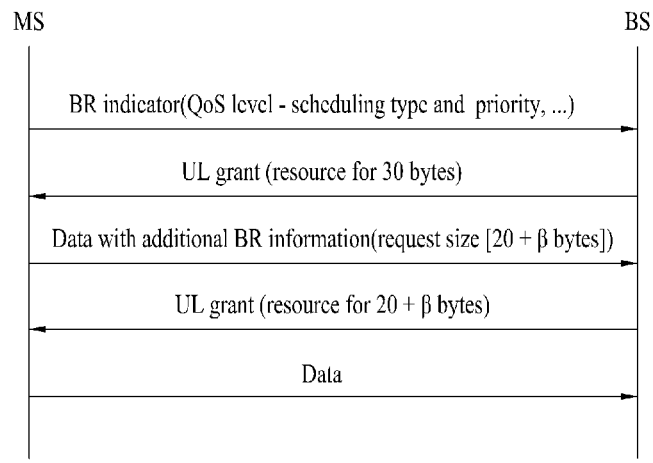
FIG. 22 is a diagram for a case that a base station allocates a resource of an allocable size if unable to allocate a resource of a fixed size to a mobile station.

FIG. 22 is a diagram for a case that a base station allocates a resource of an allocable size if unable to allocate a resource of a fixed size to a mobile station. In FIG. 22, assuming that a fixed size is 100 bytes and that a size of a resource actually necessary for a mobile station is 50 bytes, since a base station has no information on a size of a resource necessary for the mobile station, the base station should allocate 100 bytes of the fixed size. Yet, since the base station is unable to allocate 100 bytes, the base station allocates 30 bytes of the resource size that can be allocated by the mobile station. If so, the mobile station transmits data to the base station together with additional bandwidth request information (additional BR information). In doing so, the mobile station makes a request for a resource of '20+size (−) of a resource used to transmit the additional BR information' bytes to the base station.

Figure 23:
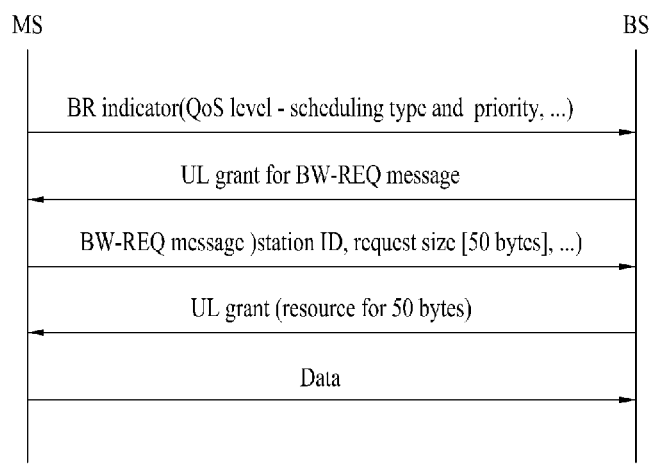
FIG. 23 is a diagram for a 5-step switching case in case that a base station is unable to allocate a resource of a fixed size to a mobile station.

FIG. 23 is a diagram for a 5-step switching case in case that a base station is unable to allocate a resource of a fixed size to a mobile station. In FIG. 23, assuming that a fixed size is 100 bytes and that a size of a resource actually necessary for a mobile station is 50 bytes, since a base station has no information on a size of a resource necessary for the mobile station, the base station should allocate 100 bytes of the fixed size. Yet, since the base station is unable to allocate 100 bytes, the base station allocates a resource of a size capable of transmitting a bandwidth request message (BW-REQ message). Subsequently, if the mobile station sends the bandwidth request message to the base station via the allocated resource, the base station allocates the resource of the mobile station requested size to the mobile station.

In the following description, a case of transmitting information on a size of a resource requested by a mobile station to a base station is explained.

First of all, a mobile station makes a request for a resource of a size necessary for the mobile station to a base station based on a fixed size. In particular, the mobile station informs the base station of a difference between a default value previously determined between the mobile station and the base station and a size of a resource requested by the mobile station. If so, the base station allocates the resource of the requested size to the mobile station.

Figure 24:
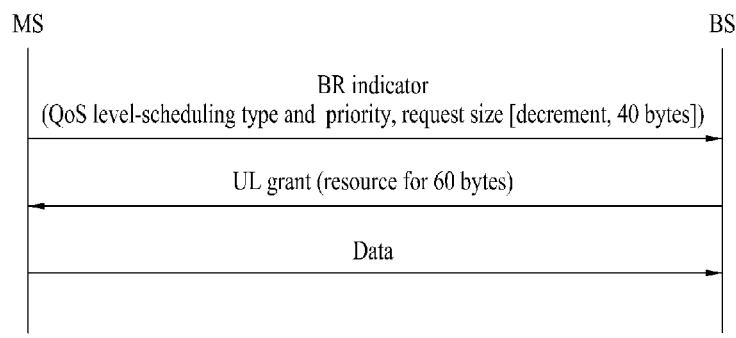
FIG. 24 is a diagram for a case that a size of a resource requested by a mobile station is smaller than a fixed size.

FIG. 24 is a diagram for a case that a size of a resource requested by a mobile station is smaller than a fixed size. And, FIG. 25 is a diagram for a case that a size of a resource requested by a mobile station is greater than a fixed size.

In FIG. 24, assuming that a fixed size is 100 bytes and that a size of a resource actually necessary for a mobile station is 60 bytes, the mobile station requests a resource of a size smaller by 40 bytes than the fixed size. If so, the base station allocates the resource of 60 bytes to the mobile station.

Figure 25:
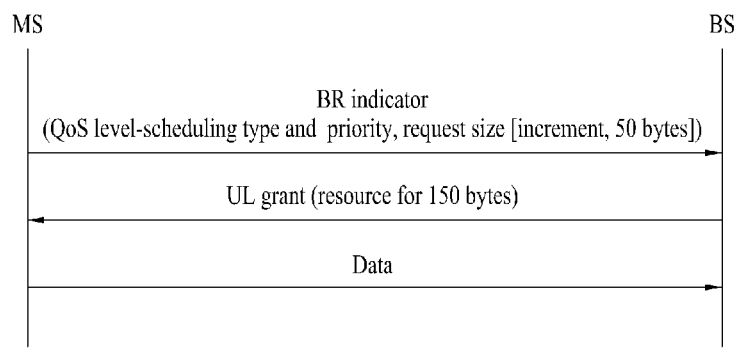
FIG. 25 is a diagram for a case that a size of a resource requested by a mobile station is greater than a fixed size.

In FIG. 25, assuming that a fixed size is 100 bytes and that a size of a resource actually necessary for a mobile station is 150 bytes, the mobile station requests a resource of a size greater by 50 bytes than the fixed size. If so, the base station allocates the resource of 150 bytes to the mobile station.

Figure 26:
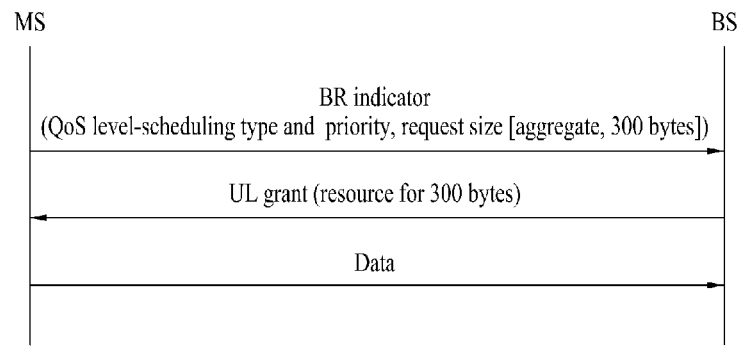
FIG. 26 is a diagram for a case that a base station is informed of a size of a resource requested by a mobile station.

FIG. 26 is a diagram for a case that a base station is informed of a size of a resource requested by a mobile station. In FIG. 26, assuming that a size of a resource requested by a mobile station is 300 bytes, the mobile station makes a request for 300 bytes to a base station. Subsequently, the base station allocates 300 bytes to the mobile station.

In case that a mobile station transmits an information on a size of a requested resource to a base station, if the base station is unable to allocate the resource of the requested size to the mobile station, the base station allocates the resource of a size available for the corresponding allocation to the mobile station or is able to switch to the 5-step scheme.

Referring now to FIG. 1, having received the allocation of the bandwidth from the base station by the 3-step scheme, the mobile station transmits data to the base station using the allocated bandwidth [S150].

According to the 5-step scheme, if the mobile station transmits a bandwidth request indicator to the base station [S110], the base station allocates a resource for a bandwidth request message to the mobile station [S120]. The mobile station then sends the bandwidth request message to the base station using the allocated resource [S130]. If so, the base station allocates a resource for data to the mobile station [S140]. The mobile station then transmits the data to the base station using the allocated resource [S150].

In the following description, a format of a bandwidth request message is described. First of all, a format of a bandwidth request message is determined in accordance with the number of requested flows and whether QoS ID, QoS level of scheduling type/property of each of a plurality of flows is identical (if a plurality of requested flows exists).

Table 6 shows a format of a bandwidth request message. Referring to Table 6, a 'flow unit' type is BR type used if the number of flow requested by a mobile station is 1. 'QoS unit' type is BR type used when a mobile station requests a plurality of flows, each of which QoS ID, QoS level or scheduling type/priority is identical. And, 'Station unit' type is BR type used when a plurality of flows, each of which QoS ID, QoS level or scheduling type/priority is different, are requested.

TABLE 6

| Bandwidth request type (2 bits) | Description | Notes |
| --- | --- | --- |
| 00 | Flow unit | Flow unit type is used when requesting bandwidth for one flow. |
| 01 | QoS unit | QoS unit type is used when requesting bandwidth for one or multiple flows whose scheduling type and priority are the same |

TABLE 6-continued

| Bandwidth request type (2 bits) | Description | Notes |
| --- | --- | --- |
| 10 | Station unit | Station unit type is used when requesting bandwidth for multiple flows whose scheduling type and priority are different |
| 11 | Reserved | |

Table 7 shows a format of a bandwidth request message if BR type is a flow unit.

TABLE 7

| Field | Length (bit) | Description |
| --- | --- | --- |
| Bandwidth request type = 0b00 | 2 | 00: flow unit type |
| Flow ID | 4 | |
| Sign | 2 | 00: aggregate BR<br>01: incremental BR<br>10: decremental BR<br>11: reserved |
| Bandwidth request size | 11 | |
| Reserved | 1 | |
| STID | 12 | Station identifier |

Referring to Table 7, a field 'sign' is the field indicating whether a size of a resource requested by a mobile station has a value greater or smaller than a size of a resource requested right before. In particular, if a size of a resource requested by a mobile station has a value greater than a size of a resource requested right before, the field 'sign' is set to 01. If a size of a resource requested by a mobile station has a value smaller than a size of a resource requested right before, the field 'sign' is set to 10.

In this case, the size of the resource requested right before can include a size of a resource requested in a bandwidth request message most recently sent by the mobile station or a size of a resource requested in either a bandwidth request message or a quick access message, which sent most recently by the mobile station.

Table 8 and Table 9 show formats of a bandwidth request message if BR type is QoS unit.

TABLE 8

| Field | Length (bit) | Description |
| --- | --- | --- |
| Bandwidth request type = 0b01 QoS ID | 2 | 01: QoS unit type |
| Sign | 2 | 00: aggregate BR<br>01: incremental BR<br>10: decremental BR<br>11: reserved |
| Bandwidth request size | 11 | |
| Reserved | 1 | |
| STID | 12 | Station identifier |

TABLE 9

| Field | Length (bit) | Description |
| --- | --- | --- |
| Bandwidth request type = 0b01 | 2 | 01: QoS unit type |
| Scheduling type | 3 | 000: UGS<br>001: rtPS<br>010: ertPS<br>011: nrtPS<br>100: BE<br>101~111: reserved |

TABLE 9-continued

| Field | Length (bit) | Description |
|---|---|---|
| Priority | 1 | 0: High |
| | | 1: Low |
| Sign | 2 | 00: aggregate BR |
| | | 01: incremental BR |
| | | 10: decremental BR |
| | | 11: reserved |
| Bandwidth request size | 11 | |
| Reserved | 1 | |
| STID | 12 | Station identifier |

In case that BR type is QoS unit, a bandwidth request message is able to include QoS ID, as shown in Table 8, or is able to include scheduling type and priority, as shown in Table 9. And, in Table 9, the bandwidth request message is able to include service type instead of scheduling type.

Table 10 shows a format of a bandwidth request message if BR type is Station unit.

TABLE 10

| Field | Length (bit) | Description |
|---|---|---|
| Bandwidth request type = 0b10 | 2 | 10: Station unit type |
| Mixed typ | 2 | 00: real time services (UGS, rtPS, ertPS) |
| | | 01: non-real time services (nrtPS, BE) |
| | | 10: real time and non-real time service (UGS, rtPS, ertPS, nrtPS, BE) |
| | | 11: reserved |
| Bandwidth request size | 8 | For the flow of the highest priority |
| Bandwidth request size | 8 | For the rest of the flows |
| STID | 12 | Station identifier |

In Table 10, a field 'Mixed type' indicates properties of a plurality of flows requested by a mobile station. In particular, if a plurality of flows requested by a mobile station is real time services, the field 'Mixed type' is set to 0b00. If a plurality of flows requested by a mobile station is non-real time services, the field 'Mixed type' is set to 0b01. If some of a plurality of flows requested by a mobile station is real time services and the rest of the flows are non-real time services, the field 'Mixed type' is set to 0b10.

'Bandwidth request size I' field indicates a size of a resource required for transmitting a flow having a highest priority among a plurality of flows requested by a mobile station. And, 'Bandwidth request size II' field indicates a size of a resource required for transmitting the rest of the flows.

Figure 27:
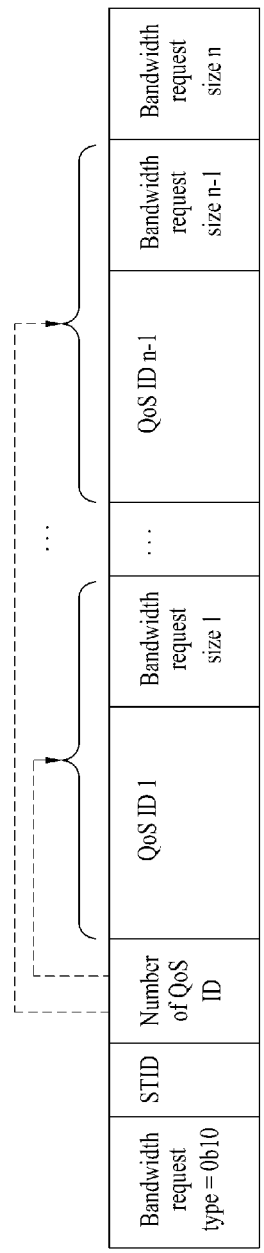
FIG. 27 shows another example of a format of a bandwidth request message if BR type is a station unit.

FIG. 27 shows another example of a format of a bandwidth request message if BR type is a station unit.

In FIG. 27, a field 'Number of QoS ID' indicates the number of QoS ID included in a bandwidth request message. When BR type is Station unit, if the number of QoS ID included in a bandwidth request message is fixed, it is not necessary for the bandwidth request message to include the field 'Number of QoS ID'.

A field 'QoS ID' can be substituted with a field indicating at least one parameter for determining QoS among scheduling type, priority and the like.

A field 'Bandwidth request size' indicates a size of a resource required for transmitting data having a corresponding QoS ID. And, the bandwidth request message includes the fields 'bandwidth request size' as many as "value of the field 'Number of QoS ID'+1".

The last field 'bandwidth request size' indicates a size of a resource required for transmitting data having QoS ID of a lowest priority.

When the BR type shown in FIG. 27 is Station unit, Table 11 shows a bandwidth request message if a value of a field 'Number of QoS ID' in a format of the bandwidth request message is set to 1.

TABLE 11

| Field | Length (bit) | Description |
|---|---|---|
| Bandwidth request type = 0b10 | 2 | Station unit type |
| Number of QoS ID | | 1 |
| QoS ID | | |
| Bandwidth request size | 11 | |
| Bandwidth request size | 1 | |
| STID | 12 | Station identifier |

Referring to Table 11, a field 'QoS ID' indicates a QoS ID of a flow having a highest priority among flows to be transmitted by a mobile station. A field 'Bandwidth request size I' indicates a size of a resource required for transmitting one or more flows of a QoS ID having a high priority. And, a field 'Bandwidth request size II' indicates a size of a resource requested by a mobile station for one or more flows of QoS IDs having low priorities.

Figure 28:
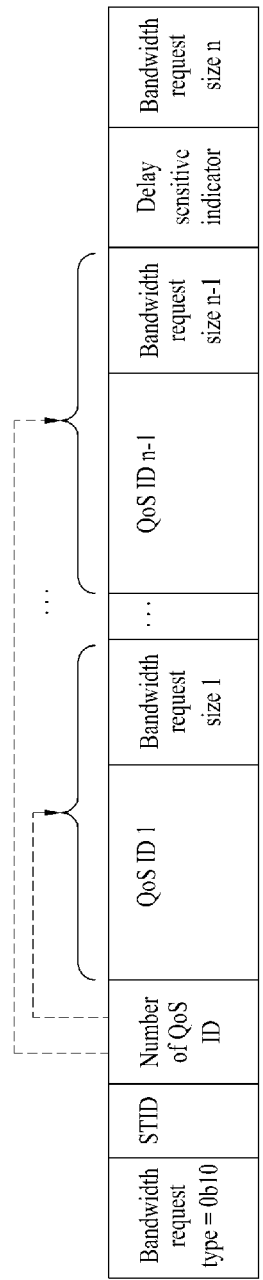
FIG. 28 shows further example of a format of a bandwidth request message if BR type is a station unit.

FIG. 28 shows further example of a format of a bandwidth request message if BR type is a station unit.

A bandwidth request message shown in FIG. 28 is configured in a manner of adding additional information (indicating a presence or non-presence of delay sensitivity) on a last field 'bandwidth request size' to the bandwidth request message shown in FIG. 27. A field 'delay sensitive indicator' indicates property of one or more flows requested via the last field 'bandwidth request size'. A value of the field 'delay sensitive indicator' can indicate one of 'delay sensitive flow set with different priorities', 'delay sensitive flow set & delay tolerant flow set' and 'delay tolerant flow set with different priorities'.

Figure 29:
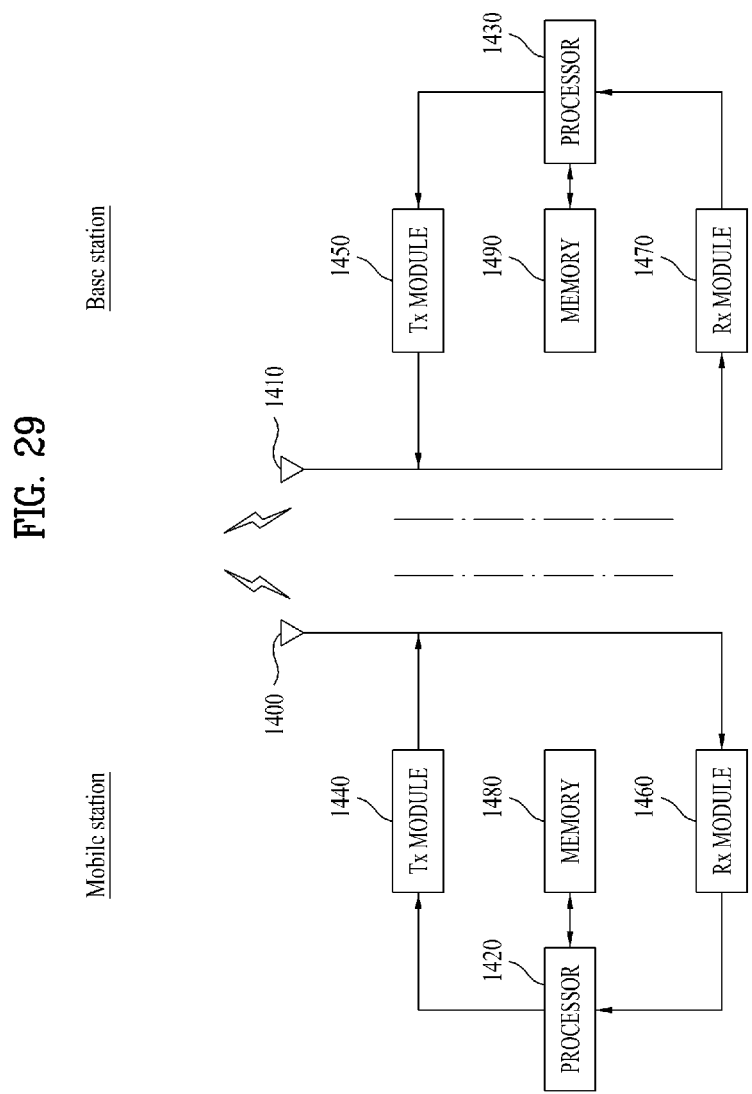
FIG. 29 is a diagram for configurations of a mobile station and a base station, in which the above-mentioned embodiments of the present invention can be implemented, according to another embodiment of the present invention.

FIG. 29 is a diagram for configurations of a mobile station and a base station, in which the above-mentioned embodiments of the present invention can be implemented, according to another embodiment of the present invention.

A mobile station/base station (AMS/ABS) includes an antenna 1400/1410 capable of transmitting and receiving information, data, signals and/or messages and the like, a transmitting module (Tx module) 1440/1430 transmitting a message by controlling the antenna, a receiving module (Rx module) 1460/1450 receiving a message by controlling the antenna, a memory 1480/1470 storing informations associated with communications with the base station, and a processor 1420/1410 controlling the transmitting module, the receiving module and the memory. In this case, the base station can include a femto base station or a macro base station.

The antenna 1400/1410 externally transmits a signal generated from the transmitting module 1440/1430. And, the antenna 1400/1410 externally receives a radio signal and then delivers the received radio signal to the receiving module 1460/1450. In case that a multi-antenna (MIMO) function is supported, at least two antennas can be provided.

The processor 1420/1410 generally controls overall operations of the mobile station/base station. In particular, the processor is able to perform a control function for performing the above-described embodiments of the present invention, a MAC (medium access control) frame variable control function according to service characteristics and propagation environment, a handover function, an authentication function, an encryption function and the like. And, the processor 1420/1430 can further include an encryption module configured to encrypt various messages and a timer module configured to control transmissions and receptions of the various messages.

The transmitting module 1440/1430 performs prescribed coding and modulation on a signal and/or data, which is scheduled by the processor and will be then transmitted externally, and is then able to deliver the coded and modulated signal and/or data to the antenna 1400/1410.

The receiving module 1460/1450 reconstructs the radio signal received externally via the antenna 1400/1410 into original data in a manner of performing decoding and demodulation on the received radio signal and is then able to deliver the reconstructed original data to the processor 1420/1430.

The memory 1480/1470 can store programs for processing and control of the processor and is able to perform a function of temporarily storing input/output data (e.g., in case of a mobile station, UL grant allocated by the base station, system information, station identifier (STID), a flow identifier (FID), an action time, region allocation information, frame offset information, etc.).

And, the memory can include at least one of storage media including a flash memory, a hard disk, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

The processor 1430 provided to the base station is able to support an idle mode operation of the mobile station. For instance, if DREG-REQ message is received from the mobile station, the processor of the base station configures DREG-CMD message including at least one of P timer and paging information and is then able to send the configured message to the mobile station.

And, the base station is able to support a location update of the mobile station. For instance, if the base station receives a ranging request message from the mobile station, the processor of the base station is able to sent a ranging response message including at least one of a P timer parameter and a new paging information to the mobile station. In this case, the base station can include an overlay macro cell base station or a femto cell base station.

Embodiments of the present invention can be implemented using various means. For instance, embodiments of the present invention can be implemented using hardware, firmware, software and/or any combinations thereof. In case of the implementation by hardware, a handover method and a base station information transmitting method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a handover method and a base station information transmitting method according to one embodiment of the present invention can be implemented by modules, procedures, functions and the like for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

It is apparent that an embodiment can be configured by combining claims, which are not explicitly cited in-between, together without departing from the spirit and scope of 'what is claimed is' or that those claims can be included as new claims by revision after filing an application.

What is claimed is:

1. A radio resource allocating method for a bandwidth request transmission in a base station (BS) of a wireless communication system, the method comprising:
   allocating a first radio resource for the bandwidth request transmission of a mobile station (MS), the radio resource allocated to the MS while providing a service;
   receiving a bandwidth request message from the MS via the allocated first radio resource, the bandwidth request message including a first field that includes first information indicating a type of the service for which the MS is communicating with the BS and a second field that includes second information, wherein a type of the second information is determined based on the first information, wherein the second information is an identifier of the MS when the first information indicates that the service is a delay-sensitive service and wherein the second information is a size of requested bandwidth when the first information indicates that the service is a delay-tolerable service; and
   allocating a second radio resource to the MS in response to the bandwidth request message, wherein a size of the second radio resource is pre-determined by negotiation between the BS and the MS when the first information indicates that the service is the delay-sensitive service and wherein the size of the second radio resource is determined according to the size of the requested bandwidth when the first information indicates that the service is the delay-tolerable service.

2. The method of claim 1, wherein:
   the first radio resource includes a bandwidth request code and a specific position in a time-frequency domain; and
   receiving the bandwidth request message comprises receiving the bandwidth request code via the specific position in the time-frequency domain.

3. The method of claim 1, wherein:
   the first radio resource is allocated to a plurality of mobile stations; and
   the bandwidth request message is received from an indicated one of the plurality of the mobile stations via the allocated first radio resource.

4. A method of requesting a bandwidth in a mobile station (MS) during a voice service in a wireless communication system, the method comprising:
   receiving an allocation of a first radio resource from a base station (BS) for a bandwidth request transmission; and
   transmitting a bandwidth request message to the BS via the allocated first radio resource, the bandwidth request message including a first field that includes first information indicating a type of a service for which the MS is communicating with the BS and a second field that includes second information, wherein a type of the second information is determined based on the first information, wherein the second information is an identifier of the MS when the first information indicates that the service is a delay-sensitive service and wherein the second information is a size of requested bandwidth when the first information indicates that the service is a delay-tolerable service; and receiving an allocation of a second radio resource to the MS in response to the bandwidth request message, wherein a size of the second radio resource is pre-determined by negotiation between the base station and the MS when the first information indicates that the service is the delay-sensitive service and wherein the size of the second radio resource is determined according to the size of the requested bandwidth when the first information indicates that the service is the delay-tolerable service.

5. The method of claim 4, wherein:

the first radio resource includes a bandwidth request code and a specific position in a time-frequency domain; and transmitting the bandwidth request message comprises transmitting the bandwidth request code via the specific position in the time-frequency domain.

* * * * *